(12) United States Patent
Hawkes

(10) Patent No.: US 12,071,936 B2
(45) Date of Patent: Aug. 27, 2024

(54) VORTEX STATION

(71) Applicant: AUCKLAND UNISERVICES LIMITED, Auckland (NZ)

(72) Inventor: Neil Andrew Hawkes, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 18/238,748

(22) Filed: Aug. 28, 2023

(65) Prior Publication Data

US 2024/0060472 A1 Feb. 22, 2024

Related U.S. Application Data

(63) Continuation of application No. 16/315,207, filed as application No. PCT/NZ2017/050092 on Jul. 6, 2017, now Pat. No. 11,739,731.

(30) Foreign Application Priority Data

Jul. 6, 2017 (NZ) ........................................ 721916

(51) Int. Cl.
  *F03D 9/39* (2016.01)
  *F03D 3/00* (2006.01)
  (Continued)

(52) U.S. Cl.
  CPC ............. *F03D 9/39* (2016.05); *F03D 3/005* (2013.01); *F03D 3/061* (2013.01); *F03D 3/02* (2013.01);
  (Continued)

(58) Field of Classification Search
  CPC . F03D 9/39; F03D 3/005; F03D 3/061; F03D 3/02; F03D 9/34; F05B 2260/209;
  (Continued)

(56) References Cited

U.S. PATENT DOCUMENTS 401,516 A    4/1889  Robb
3,936,652 A * 2/1976  Levine .................... F03D 15/10
                                                261/DIG. 11
(Continued)

FOREIGN PATENT DOCUMENTS

CN    101304950    11/2008
CN    101535638    9/2009
(Continued)

*Primary Examiner* — Pedro J Cuevas
(74) *Attorney, Agent, or Firm* — Loginov & Associates, PLLC; William A. Loginov

(57) ABSTRACT

This invention relates to a vortex station and method for producing a vortex similar to one of a group consisting of dust-devils and waterspouts. The apparatus comprises a ground platform forming a base for the vortex station, a plurality of vanes to direct an air flow into a vortex station and about the vortex station in a substantially swirling manner, at least one wind turbine disposed near the centre of said vortex station, in a path of a concentrated air flow, wherein the movement of the air in the vortex station is such that an atmospheric buoyancy vortex is created in the centre of the vortex station, a supply of a working fluid (e.g. water) to the vortex station at or near the centre of the vortex station such that the air is of a saturated condition or an at least partially saturated condition with the working fluid (e.g. water), the working fluid (e.g. water) supplied at a sufficient quantity or amount so as to assist with maintaining buoyancy and stability of a vortex created.

19 Claims, 16 Drawing Sheets

(51) Int. Cl.
*F03D 3/02* (2006.01)
*F03D 3/06* (2006.01)
*F03D 9/34* (2016.01)
*F15C 1/16* (2006.01)
*F23R 3/12* (2006.01)
*F23R 3/58* (2006.01)

(52) U.S. Cl.
CPC .......... *F03D 9/34* (2016.05); *F05B 2240/132* (2013.01); *F05B 2240/211* (2013.01); *F05B 2240/30* (2013.01); *F05B 2240/3062* (2020.08); *F05B 2260/209* (2013.01); *F15C 1/16* (2013.01); *F23R 3/12* (2013.01); *F23R 3/58* (2013.01); *Y02B 10/30* (2013.01); *Y02E 10/70* (2013.01); *Y02E 10/728* (2013.01); *Y10T 137/2087* (2015.04); *Y10T 137/2104* (2015.04)

(58) Field of Classification Search
CPC .......... F05B 2240/132; F05B 2240/211; F05B 2240/30; F05B 2240/3062; Y02B 10/30; Y02E 10/70; Y02E 10/728; Y02E 10/74; Y10T 137/2087; Y10T 137/2104
See application file for complete search history.

(56) References Cited

U.S. PATENT DOCUMENTS

| | | | |
|---|---|---|---|
| 4,016,725 A | 4/1977 | Fiss | |
| 4,018,543 A | 4/1977 | Carson | |
| 4,031,173 A * | 6/1977 | Rogers | F03D 13/20 261/24 |
| 4,070,131 A | 1/1978 | Yen | |
| 4,275,309 A | 6/1981 | Lucier | |
| 4,433,544 A * | 2/1984 | Wells | F03D 9/007 290/55 |
| 4,452,046 A * | 6/1984 | Valentin | F03D 9/39 60/641.11 |
| 4,499,034 A | 2/1985 | MCallister, Jr. | |
| 4,508,973 A * | 4/1985 | Payne | F03D 1/04 290/55 |
| 5,300,817 A * | 4/1994 | Baird | F03G 6/045 290/55 |
| 6,057,606 A | 5/2000 | Porat | |
| 6,510,687 B1 * | 1/2003 | Zaslavsky | F03G 7/0254 60/641.14 |
| 6,532,740 B1 | 3/2003 | Sullivan | |
| 6,590,300 B1 | 7/2003 | Preito Santiago | |
| 6,590,330 B1 | 7/2003 | Van Doorn | |
| 6,943,461 B2 * | 9/2005 | Kaploun | F03D 9/39 290/43 |
| 7,086,823 B2 | 8/2006 | Michaud | |
| 7,154,190 B2 * | 12/2006 | Kaploun | F03D 9/25 290/43 |
| 7,400,057 B2 * | 7/2008 | Sureshan | F03D 9/25 290/55 |
| 7,404,837 B2 | 7/2008 | Killion | |
| 7,511,387 B2 * | 3/2009 | Fakhrai | F03D 1/04 290/43 |
| 7,821,151 B2 * | 10/2010 | Le | F03D 9/25 290/43 |
| 7,938,615 B2 | 5/2011 | Michaud | |
| 8,534,068 B2 * | 9/2013 | Yangpichit | H02K 7/1823 290/55 |
| 8,875,509 B2 | 11/2014 | Glezer | |
| 8,875,511 B2 | 11/2014 | Simpson | |
| 9,273,665 B1 | 3/2016 | Krippene | |
| 9,291,150 B2 * | 3/2016 | Bassett | F03D 3/005 |
| 9,303,623 B2 | 4/2016 | Wygnanski | |
| 9,453,494 B2 | 9/2016 | Krippene | |
| 9,567,971 B2 * | 2/2017 | Bassett | F03D 3/061 |
| 9,567,972 B2 * | 2/2017 | Bassett | F03D 3/061 |
| 9,850,883 B1 * | 12/2017 | Maldonado | F01D 15/10 |
| 9,863,313 B2 | 1/2018 | Glezer | |
| 9,903,349 B2 * | 2/2018 | Yangpichit | H02K 7/1823 |
| 10,337,504 B1 * | 7/2019 | Al-Sulaiman | F24S 23/31 |
| 10,371,125 B1 * | 8/2019 | Al-Sulaiman | F24S 70/60 |
| 10,378,519 B1 * | 8/2019 | Al-Sulaiman | H02K 7/1823 |
| 10,876,519 B1 * | 12/2020 | Chaapel | F03D 13/20 |
| 11,022,096 B2 * | 6/2021 | Monto | F03D 3/005 |
| 11,493,066 B2 | 11/2022 | Abramov | |
| 2005/0223719 A1 | 10/2005 | Killion | |
| 2008/0314058 A1 | 12/2008 | Jones | |
| 2011/0236181 A1 | 9/2011 | Wygnanski | |
| 2012/0139259 A1 | 6/2012 | Glezer | |
| 2012/0187698 A1 | 7/2012 | Bassett | |
| 2013/0257055 A1 | 10/2013 | Simpson | |
| 2014/0105738 A1 * | 4/2014 | Bassett | F03D 9/25 239/589 |
| 2014/0105743 A1 * | 4/2014 | Bassett | F03D 3/061 416/126 |
| 2014/0105752 A1 * | 4/2014 | Andrews | F03B 17/065 416/241 R |
| 2014/0284928 A1 | 9/2014 | Mital | |
| 2015/0047352 A1 | 2/2015 | Glezer | |
| 2015/0233353 A1 * | 8/2015 | Bertony | F03D 7/06 416/147 |
| 2016/0084227 A1 | 3/2016 | Krippene | |
| 2019/0309729 A1 | 10/2019 | Hawkes | |
| 2020/0040870 A1 * | 2/2020 | Monto | F03D 3/005 |
| 2021/0277865 A1 * | 9/2021 | Monto | F03D 3/0427 |

FOREIGN PATENT DOCUMENTS

| | | |
|---|---|---|
| DE | 102008013141 A1 | 9/2009 |
| DE | 102008018433 | 10/2009 |
| EA | 200400122 | 8/2004 |
| EA | 200400120 | 6/2005 |
| EA | 007635 | 12/2006 |
| EA | 007937 | 2/2007 |
| EP | 1790918 | 5/2007 |
| EP | 3482071 | 5/2019 |
| GB | 1231582 | 5/1971 |

* cited by examiner

VORTEX STATION

FIELD OF THE INVENTION

The present invention relates to a vortex station in which a tornado-like convective vortex is created from a source of heat, such as a waste heat source, and that heat is converted into electricity.

BACKGROUND

Many attempts have been made to exploit waste heat for electrical power generation but the low power densities available at low temperatures make the equipment required in such a process implausibly large and expensive. For "fuel-free" energy sources, capital and operating costs are key to economic viability, so using an atmospheric buoyancy vortex as a "virtual chimney vortex" (hereafter referred to as a VCV) is appealing. The costs of tall structures and large turbines are avoided, since the VCV concentrates the buoyancy power as high wind-speeds at ground level. The VCV itself may be very large and be established at low cost.

U.S. Pat. No. 7,086,823 discloses such a vortex or vortex engine. However, it requires a costly vertical cylindrical wall surrounding an arena to create the vortex.

SUMMARY OF THE INVENTION

An object of the present invention is to provide a vortex station that will increase, or that will go at least some way toward increasing, the efficiency of prior systems.

An alternative object of the invention is to provide a vortex station that will at least go at least some way toward overcoming disadvantages of existing systems, or which will at least provide a useful alternative to existing systems.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

In a first aspect the present invention may broadly consist in a vortex station for producing a vortex similar to one of a group consisting of dust-devils and waterspouts, comprising:
  a ground platform forming a base for the vortex station,
  a plurality of vanes to direct an air flow into a vortex station and about the vortex station in a substantially swirling manner;
  at least one wind turbine disposed near the centre of said vortex station, in a path of a concentrated air flow, wherein the movement of the air in the vortex station is such that an atmospheric buoyancy vortex is created in the centre of the vortex station;
  a supply of a working fluid (e.g. water) to the vortex station at or near the centre of the vortex station such that the air is of a saturated condition or an at least partially saturated condition with the working fluid (e.g. water), the working fluid (e.g. water) supplied at a sufficient quantity or amount so as to assist with maintaining buoyancy and stability of a vortex created In a second aspect the present invention may broadly consist in a vortex station for producing a vortex similar to one of a group consisting of dust-devils and waterspouts, comprising:
  a ground platform forming a base for the vortex station,
  a plurality of vanes to direct air into a vortex station and about the vortex station in a swirling manner (that is to say, with horizontal circulation);
  at least one wind turbine disposed near the centre of said vortex station, in a path of concentrated air flow, wherein the movement of the air in the vortex station is such that an atmospheric buoyancy vortex is created in the centre of the vortex station;
  a supply of water to the vortex station at or near the centre of the vortex station such that the air is in a saturated condition or an at least partially saturated condition so as to assist with the buoyancy and stability of the vortex created and to ensure the vortex has a high aspect ratio.

In a third aspect the present invention may broadly consist in a vortex station for producing a vortex similar to one of a group consisting of dust-devils and waterspouts, comprising:
  a ground platform forming a base for the vortex station,
  a plurality of vanes to direct air into a vortex station and about the vortex station in a swirling manner (that is to say, with horizontal circulation);
  at least one wind turbine disposed near the centre of said vortex station, in a path of concentrated air flow, wherein the movement of the air in the vortex station is such that an atmospheric buoyancy vortex is created in the centre of the vortex station;
  a supply of vaporisable liquid or working fluid (such as water) to the vortex station at or near the centre of the vortex station, the supply of the vaporisable liquid or working fluid (such as water) being supplied at a sufficient quantity or flow rate to provide for at least some of the air being in a saturated condition or an at least a partially saturated condition with the vaporisable liquid or working fluid to increase an aspect ratio (such as, height of vortex to width of the core of the vortex), such that the increased aspect ratio assists with the buoyancy and stability of the vortex created.

In a fourth aspect the present invention may broadly consist in a method of increasing the stability of a man-made vortex within a vortex station, comprising:
  providing a ground platform forming a base for the vortex station,
  feeding a supply of air into the vortex station via a plurality of vanes, the vanes configured to direct the supplied air into the vortex station in a manner so as to initiate a swirling of the air,
  providing and positioning at least one wind turbine disposed near the centre of said vortex station, in a path of concentrated air flow, wherein the movement of the air in the vortex station is such that an atmospheric buoyancy vortex is created in the centre of the vortex station, and
  supplying of a vaporisable liquid or working fluid (e.g. water) to the vortex station at or near the centre of the vortex station, the supply of the vaporisable liquid or working fluid (such as a heated or hot water stream) being supplied at a sufficient quantity or flow rate to provide for at least some of the air being in a partial or saturated condition to increase an aspect ratio, such that the increased aspect ratio assists with the buoyancy and stability of the vortex created.

In a fifth aspect the present invention may broadly consist in a process for maintaining a man-made vortex generated from a vortex station, comprising:

providing a ground platform forming a base for a vortex station, providing and arranging a plurality of vanes about a periphery of said vortex station for directing of air flows into the vortex station in a substantially swirling manner (such as, with a horizontal circulation), providing or supping a source of vaporisable liquid or working fluid (e.g. water) to the vortex station at or near the centre of the vortex station, the supply of the vaporisable liquid or working fluid (e.g. water) being supplied at a sufficient quantity or flow rate to provide for at least some of the air flow being introduced to a vortex generated within the vortex station being in a saturated condition or an at least a partially saturated condition, and continuing to provide or supply said source of the vaporisable liquid or working fluid (e.g. water) once a vortex has been created.

In a sixth aspect the present invention may broadly consist in a vortex station for producing a vortex similar to one of a group consisting of dust-devils and waterspouts, comprising:

a ground platform forming a base for the vortex station, a plurality of vanes to direct air into a vortex station and about the vortex station in a swirling manner (that is to say, with horizontal circulation);

at least one wind turbine disposed near the centre of said vortex station, in a path of concentrated air flow, wherein the movement of the air in the vortex station is such that an atmospheric buoyancy vortex is created in the centre of the vortex station;

a means for supplying of water to the vortex station at or near the centre of the vortex station such that the air is of a saturated condition or an at least partially saturated condition, the water supplied at a sufficient quantity or amount so as to assist with the buoyancy and stability of the vortex created.

In a seventh aspect the present invention may broadly consist in a vortex station for producing a vortex similar to one of a group consisting of dust-devils and waterspouts, comprising:

a ground platform forming a base for the vortex station, a plurality of vanes to direct air into a vortex station and about the vortex station in a swirling manner (that is to say, with horizontal circulation);

at least one wind turbine disposed near the centre of said vortex station, in a path of concentrated air flow, wherein the movement of the air in the vortex station is such that an atmospheric buoyancy vortex is created in the centre of the vortex station;

a supply of water to the vortex station at or near the centre of the vortex station such that the air is in a saturated condition or an at least partially saturated condition so as to assist with the buoyancy and stability of the vortex created and to ensure the vortex has a high aspect ratio.

In an eighth aspect the present invention may broadly consist in a vortex station for producing a vortex similar to one of a group consisting of dust-devils and waterspouts, comprising:

a ground platform forming a base for the vortex station, a plurality of vanes to direct air into a vortex station and about the vortex station in a swirling manner (that is to say, with horizontal circulation);

at least one wind turbine disposed near the centre of said vortex station, in a path of concentrated air flow, wherein the movement of the air in the vortex station is such that an atmospheric buoyancy vortex is created in the centre of the vortex station;

a supply of vaporisable liquid (such as water) to the vortex station at or near the centre of the vortex station, the supply of the vaporisable liquid (such as water) being supplied at a sufficient quantity or flow rate to provide for at least some of the air being in a saturated condition or an at least a partially saturated condition to increase an aspect ratio (such as, height of vortex to width of the core of the vortex), such that the increased aspect ratio assists with the buoyancy and stability of the vortex created.

In a ninth aspect the present invention may broadly consist in a process for maintaining a vortex generated from a vortex station, comprising:

providing a ground platform forming a base for a vortex station, providing and arranging a plurality of vanes about a periphery of said vortex station for directing of air flows into the vortex station in a substantially swirling manner (such as, with a horizontal circulation), providing or supping a source of vaporisable liquid (such as water) to the vortex station at or near the centre of the vortex station, the supply of the vaporisable liquid (such as water) being supplied at a sufficient quantity or flow rate to provide for at least some of the air flow being introduced to a vortex generated within the vortex station being in a saturated condition or an at least a partially saturated condition, and continuing to provide or supply said source of vaporisable liquid (such as water) once a vortex has been created.

Preferably, the vaporisable liquid or working fluid is water, optionally the water is a heated water stream.

Preferably, air flowing into the vortex is sufficiently conditioned so to approach a condition of saturation.

Preferably, the air flowing into the vortex station is sufficiently conditioned so as to allow release of a sufficient amount of latent heat through condensation in the created vortex core so as to maintain buoyancy and stability of the created vortex, the vortex thereby achieving a greater height than would otherwise occur without conditioning of said air flowing into the vortex station.

Preferably, the vaporisable liquid or working fluid (e.g. water) is supplied at a sufficient quantity or amount, or the air flow directed to the vortex station is conditioned to be of a sufficient saturation, to enable generation of a relatively high aspect ratio vortex.

Preferably, a relatively high aspect ratio is a ratio of the height of the vortex to the width of the core of the created vortex being greater than about 15:1.

Preferably, said at least one wind turbine is located or disposed near the centre of said vortex station, in a path of concentrated air flow, wherein the movement of the air in the vortex station is such that an atmospheric buoyancy vortex is created in the centre of the vortex station.

Preferably, provision or supply of the vaporisable liquid or working fluid (e.g. water) or source of vaporisable liquid or working fluid (e.g. water) to the vortex station and a vortex so created assists in increasing an aspect ratio (such as, height of vortex to width of the core of the vortex), such that the increased aspect ratio assists with the buoyancy and an increase in stability of a created vortex.

Preferably, the vanes and the at least one wind turbine sit within or at the boundary of the ground platform.

Preferably, said supply of the vaporisable liquid or working fluid (e.g. water) to said vortex station is by a plurality of nozzles fed from a manifold with pumped heated vaporisable liquid or working fluid (e.g. heated or hot water) water.

Preferably, wherein said plurality of nozzles are configured to produce a relatively fine spray of the vaporisable liquid or working fluid (e.g. heated or hot water) with a relatively large surface area, so as to allow a sufficient surface area for heat transfer to produce or condition the air flow being directed into the vortex station (e.g. warm air) that is of a saturated condition or an at least partially saturation condition with the vaporisable liquid or working fluid (e.g. water vapour), in order to drive the vortex through buoyancy.

Preferably, supplying of the vaporisable liquid or working fluid (e.g. water) to said vortex station is a plurality of nozzles fed from a manifold with pumped heated vaporisable liquid or working fluid (e.g. heated or hot water), so as to produce a fine spray of the vaporisable liquid or working fluid (e.g. heated or hot water) with a relatively large surface area, to allow a sufficient surface area for heat transfer to produce air flow into the vortex of warm air that is saturated with the vaporisable liquid or working fluid (e.g. water vapour) in order to drive the vortex through buoyancy and stabilise the core in rising through vertical acceleration providing axial strain.

Preferably, said plurality of nozzles are configured to produce a relatively fine spray of the vaporisable liquid or working fluid (e.g. heated or hot water) with a relatively large surface area, so as to allow a sufficient surface area for heat transfer to produce or condition the air flow being directed into the vortex station (e.g. warm air) that is of a saturated condition or an at least partially saturation condition with of vapour of the vaporisable liquid or working fluid (e.g. water vapour).

Preferably, a provided or supplied source of the vaporisable liquid or working fluid (e.g. water) to a flow of air of the vortex at or near the base of the vortex station is provided in a sufficient volume or quantity to increase saturation levels or to achieve a saturation of the flow of air (such as relative humidity up to 100% relative humidity) of air introduced to the vortex.

Preferably, a provided or supplied source of the vaporisable liquid or working fluid (e.g. water), once vaporised and included in the flow of air directed to the vortex is elevated by the vortex to a height and exposed to a temperature or environmental conditions such that at least some of the vapour condenses, thereby leading to a release of latent heat in condensation at said height.

Preferably, a provided or supplied source of the vaporisable liquid or working fluid (e.g. water) is provided or supplied to the flow of air directed to vortex in an on-going manner (i.e. may be provided or supplied continuously) to the air flow being introduced to the vortex, whilst the vortex is being maintained and operated within said vortex station.

Preferably, a provided or supplied source of the vaporisable liquid or working fluid (e.g. water) for conditioning of a flow of air being directed to the vortex station increases the saturation or humidity of the air being introduced to a created vortex in the vortex station.

Preferably, the vortex station is a flat bed or a platform substantially at ground level.

Preferably, the vanes are constructed or arranged in a substantially circular manner about the periphery of the vortex station.

Preferably, the vanes comprise a plurality of adjustable deflectors.

Preferably, the vanes can include a set of fixed vanes.

Preferably, the vanes are sails.

Preferably, the sails are constructed of fabric.

Preferably, the adjustable deflector vanes are manually or remotely adjustable.

Preferably, said vortex station further comprises of a roof at the centre of the vortex station.

Preferably, the roof is of an annular shape and/or is disposed above and extends out from the at least one turbine.

Preferably, the wind turbines consist of vertical blades rotating around the vertical centreline of the station thereby sitting in the area of most concentrated airflow at the base of the vortex and produce a radial pressure differential across a cylinder shape swept by the blades so as to stabilise the base of the vortex against being moved laterally by external winds.

Preferably, the wind turbines comprise of vertical blades rotating around the vertical centreline of the station thereby sitting in the area of most concentrated airflow at the base of the vortex and produce a radial pressure differential across a cylinder shape swept by the blades so as to stabilise the base of the vortex against being moved laterally by external winds.

Preferably, a plurality of concentric turbines are used, or a single turbine is used that is provided with a plurality of concentric blade sets.

Preferably, the wind turbine is sited below the inside diameter of the annular roof.

Preferably, a manifold and nozzles for pumped vaporisable liquid or working fluid (e.g. heated or hot water) is sited below an annular roof of said vortex station and on a ground plane, within an area of air flow directed into the vortex station.

Preferably, said nozzles direct the vaporisable liquid or working fluid (e.g. water) into and against the air flow being directed into the vortex station.

Preferably, said nozzles are configured to produce or generate a mist or spray of said vaporisable liquid or working fluid (e.g. heated or hot water).

Preferably, said vortex station comprises a floor that is of a concave shape.

Preferably, the floor of the vortex station comprises a drain for collection of liquid vaporisable liquid or working fluid (e.g. water), optionally the drain is centrally located in the floor.

Preferably, the drain is fluidly connected to a reservoir or storage facility.

Preferably, liquid collected in said reservoir or storage facility may be reused or recycled.

Preferably, the water is supplied at a sufficient quantity or amount, or the air flow directed to the vortex station is conditioned to be of a sufficient saturation, to enable generation of a relatively high aspect ratio vortex.

Preferably, a relatively high aspect ratio is a ratio of the height of the vortex to the width of the core of the created vortex being greater than about 15:1.

Preferably, at least one wind turbine is located or disposed near the centre of said vortex station, in a path of concentrated air flow, wherein the movement of the air in the vortex station is such that an atmospheric buoyancy vortex is created in the centre of the vortex station.

Preferably, provision or supply of the source of vaporisable liquid to the vortex station and a vortex so created assists in increasing an aspect ratio (such as, height of vortex to width of the core of the vortex), such that the increased aspect ratio assists with the buoyancy and an increase in stability of a created vortex.

Preferably, the vanes and the at least one wind turbine sit within or at the boundary of the ground platform.

Preferably, said means for supplying water to said vortex station, or the supply of water is by a plurality of nozzles fed from a manifold with pumped hot water.

Preferably, said plurality of nozzles are configured to produce a relatively fine spray of hot water with a relatively large surface area, so as to allow a sufficient surface area for heat transfer to produce or condition the air flow being directed into the vortex station (e.g. warm air) that is of a saturated condition or an at least partially saturation condition with water vapour, in order to drive the vortex through buoyancy.

Preferably, said means for supplying water to said vortex station is a plurality of nozzles fed from a manifold with pumped hot water, so as to produce a fine spray of hot water with a large surface area, to allow a sufficient surface area for heat transfer to produce air flow into the vortex of warm air that is saturated with water vapour in order to drive the vortex through buoyancy and stabilise the core in rising through vertical acceleration providing axial strain.

Preferably, said plurality of nozzles are configured to produce a relatively fine spray of hot water with a relatively large surface area, so as to allow a sufficient surface area for heat transfer to produce or condition the air flow being directed into the vortex station (e.g. warm air) that is of a saturated condition or an at least partially saturation condition with water vapour, Preferably, according to the present invention, an apparatus or system or process has been developed which provides for or uses the latent heat released by condensation of moisture (such as a supplied source or moisture in the form of water which has been evaporated into the air flow of the created vortex) as the partially or fully saturated air rises and pressure and temperature are reduced.

Preferably, the introduction of a partially saturated or fully saturated air flow to the vortex and the subsequent condensation of the moisture providing for said saturation produces a gradient in vertical velocity (vertical acceleration or axial strain) in the vortex, so as to stretch parcels of the air in the vortex core thereby concentrating and stabilising the vortex, through conservation of angular momentum.

Advantageously, achieving a sufficient vortex stability allows for a suppression of turbulent mixing, making energy available as high wind speeds at the ground.

Preferably, the vortex station is provided or supplied with a source of liquid or vapour (e.g. liquid water or water vapour) to a flow of air of the vortex at or near the base of the vortex station is provided in a sufficient volume or quantity to increase saturation levels (such as relative humidity up to 100% relative humidity) of air introduced to the vortex.

Preferably, the provided or supplied of the source of liquid or vapour, once vaporised and included in the flow of air of the vortex is elevated by the vortex to a height and exposed to a temperature or environmental conditions such that at least some of the vapour condenses, thereby leading to a release of latent heat in condensation at said height.

Preferably, the provided or supplied source of liquid or vapour is provided or supplied to the vortex was created in an on-going manner (i.e. may be provided or supplied continuously) to the air flow being introduced to the vortex, whilst the vortex is being maintained and operated within said vortex station.

Preferably, the provided or supplied source for the saturation (whether as a partial or total saturation, e.g. increasing the relative humidity of at least some of the air being introduced to the vortex or VCV, such as for example from greater than about 0% RH (relative humidity) to about 100% RH) is a water source or supply.

Preferably, the provided or supplied source for the saturation increases the saturation or humidity of the air being introduced to a created vortex in the vortex station.

Preferably, the relative humidity as a measure of saturation of the air being introduced to the vortex in the vortex station water is greater than zero, and up to 100% relative humidity (RH), including but not limited to for example: greater than about 0% RH to about 100% RH, greater than about 1% to about 100% RH, greater than about 5% RH to about 100% RH, greater than about 10% RH to about 100% RH, greater than about 15% RH to about 100% RH, greater than about 20% RH to about 100% RH, greater than about 30% RH to about 100% RH, greater than about 35% RH to about 100% RH, greater than about 40% RH to about 100% RH, greater than about 45% RH to about 100% RH, greater than about 50% RH to about 100% RH, greater than about 55% RH to about 100% RH, greater than about 60% RH to about 100% RH, greater than about 65% RH to about 100% RH, greater than about 70% RH to about 100% RH, greater than about 75% RH to about 100% RH, greater than about 80% RH to about 100% RH, greater than about 85% RH to about 100% RH, greater than about 90% RH to about 100% RH, greater than about 95% RH to about 100% RH, Preferably, the provision or source of the saturation (whether as a partial or total saturation, e.g. increasing the relative humidity of at least some of the air being introduced to the vortex or VCV), may be achieved by directing a source or supply of relatively warm or heater liquid (e.g. water) to an arrangement which dispenses the warm or heated liquid into the air flow being introduced to the vortex or VCV.

Preferably, the warmed or heated liquid may be optionally actively heated to elevate the temperate to encourage vaporisation of the liquid once introduced to the air flow, or may be indirectly or passively heated, for example using a waste heat stream from a product plant or process, thereby further maximising energy efficiency usage from the production plant or process.

Preferably, the supply or source of saturation may be temperature controlled, or may have its temperature measured so as to provide an input to a controller to control the quantity or flow rate of the supply or source of saturation to the air flow being introduced to the vortex or VCV.

Preferably, the supply or source may be actively monitored and/or controlled based on other measured parameters of the vortex or VCV.

Preferably, said release of latent heat in condensation may contribute to one or more of:
  a lapse rate divergence,
  axial strain for hydrodynamic stability in rising,
  a high or increasing aspect ratio,
  a lower cold or reduced (temperature) reservoir temperature,
  a relatively higher thermodynamic efficiency,
  an increase in the strength of vortex wind speed (velocity).

Preferably, the vortex station may be provided with a flat bed or a platform substantially at ground level.

Preferably, the vanes are constructed or arranged in a substantially circular manner about the periphery of the vortex station.

Preferably, the vanes comprise a plurality of adjustable deflectors.

Alternatively, or additionally the vanes may be a set of fixed vanes.

Alternatively, the vanes may be sails.

Preferably, said sails are constructed of fabric, such as of a flexible material.

Preferably, said adjustable deflector vanes may be adjusted manually or remotely.

Preferably, said vortex station includes a roof at the centre of the station.

Preferably, said roof may be of an annular shape and may be disposed above and extends out from the at least one turbine.

Preferably the wind turbines consist of vertical blades rotating around the vertical centreline of the station in order to sit in the area of most concentrated airflow at the base of the vortex and produce a radial pressure differential across the cylinder swept by the blades, in order to stabilise the vortex against being moved laterally by external winds. Advantageously, this means no tower or cylindrical wall is needed.

Preferably, the wind turbines consist of vertical blades rotating around the vertical centreline of the station thereby sitting in the area of most concentrated airflow at the base of the vortex and produce a radial pressure differential across a cylinder shape swept by the blades so as to stabilise the base of the vortex against being moved laterally by external winds.

Preferably, a plurality of concentric turbines may be used, or one or a single turbine may be provided with a plurality of concentric blade sets.

Preferably, the wind turbine is sited below the inside diameter of the annular roof. The roof may occupy the zone of minimum meridional airflows at the base of the vortex. The roof may help to suppress indrawn airflow from missing a said turbine. Optionally, the roof may assist with helping to force the radial in flow into the vortex to subsequently pass or travel through a said turbine.

Preferably, passing or directing the air flow being provided to the vortex station produces a radial pressure drop of the air flow or in flow to the vortex station, such that the foot of the vortex is stabilised from being disturbed laterally, for instance by an external wind.

Preferably, the manifold and nozzles for pumped hot water is sited below the annular roof, within the area of in flow to the vortex.

Preferably, said nozzles direct the water into and against the air flow being directed into the vortex station.

Preferably, said nozzles are configured to produce or generate a mist or spray.

Preferably, vortex station comprises a floor that is concave.

Preferably, the floor of the vortex station comprises a drain for collection of liquid water.

Preferably, the drain is fluidly connected to a reservoir or storage facility.

Preferably, water collected in said reservoir or storage facility may be reused or recycled.

The following description relates to initiation or start of a vortex within a vortex station of the present invention, as well as the on-going maintenance and improvement of the created vortex, and other procedures.

Initiating the Vortex

Step 1: Provide a heat source to the vortex station.

To provide a heat source, begin pumping a heated working fluid, such as water which has an elevated temperature (elevated by heat exchange with a waste heat stream or heat source, such as from a production plant or process). The pumped working fluid is directed to one or a plurality of spray devices, such as spray nozzles, which generate a spray of the heated working fluid into the enclosure defined by side walls and roof of a vortex station.

The spraying of the heated working fluid takes place substantially in the centre of the vortex station.

The spraying of the heated working fluid provides for a buoyancy of the air within the vortex station and for any air being directed into the vortex station by one or more vanes situated about a periphery of the vortex station. The spray of heated working fluid transfers heat to the air within the vortex station and to the air being directed into the vortex station. In this way, air is heated and the air within the vortex station and air being directed into the vortex station is/are conditioned to have an increased water content. The density of the air is sufficiently reduced so as to provide for a resultant buoyancy which causes the air within the vortex station to rise and for other air to be drawn in to replace it around the base/platform of the vortex station.

Step 2: Generate a swirl

Air is drawn in to the vortex station to replace the air which has risen upward due to its conditioning from the elevated temperature sprayed working fluid. The air drawn in to the vortex station is given a direction by the vanes which are arranged about the periphery of the vortex station. In this manner, the air drawn into the station at the ground by putting vanes in the airflow provides a swirl to the air to make or direct the air drawn in to the vortex station circulate around the centre of the vortex station.

Step 3: Convective vortex initiated

From step 2, the swirl of the air flow then advects with the air rising in the centre of the vortex station (due to the buoyancy provided by the heat transfer from the working fluid being sprayed). The swirl resists the in flow of air above the ground, due to cyclostrophic balance. This results in a convective vortex.

Step 4: Because airflow into the vortex above the ground is resisted, the in flow of air at the ground is concentrated, since friction and shear at the ground bias the cyclostrophic balance to allow for an in flow of air at the ground. This is the end-wall effect. This means the vanes do not have to rise to great height in order to add swirl to the in flow of air to the vortex.

2. Concentrating the Vortex

Step 1: For the vortex to concentrate, power must be available to accelerate the airflows in the vortex.

Step 2: For power to be available it must be converted from the potential energy present in the in flows of air to the vortex station by virtue of their buoyancy, into kinetic energy. The vortex acts as a heat-engine to achieve this.

Step 3: The efficiency of the heat engine depends upon the difference in virtual equivalent temperature (temperature expressed to reflect the processes of internal work and release of latent heat in rising) between the hot reservoir from which air is drawn into the vortex at the ground and the cold reservoir to which air exits at the top of the vortex. The cold reservoir temperature depend on the lapse rate in the vortex (the rate at which the air cools in rising, which is set by the properties of the air) and the height of the vortex.

Step 4: The height of the vortex using dry air in a neutral atmosphere will be about 15 times the diameter of the vortex, due to diffusion of vorticity and heat as the core rises. When the temperature differential from the core to the surroundings and the vorticity of the core fall below the point where radial flows can be resisted, the vortex is dissipated—it falls apart into a turbulent plume. This forms the top of the vortex. This can be extended upwards by using saturated air (air at 100% relative humidity, carrying as much water vapour as it can at the prevailing temperature and pressure), which will rise while cooling at the slower pseudo adiabatic rate, due to the release of latent heat through condensation. The release of latent heat acts to maintain the temperature differential and also increases the vertical velocity, since buoyancy is increased. The vertical acceleration acts to stretch the vortex (induce axial strain) which thereby concentrates vorticity through conservation of angular momentum. The maintenance of temperature differential and vorticity against diffusion allows the vortex to rise without being dissipated, up to the height where the vortex encounters a significant temperature inversion, such as the tropopause.

Step 5: Pumping the elevated temperature working fluid (such as hot water) through a plurality of nozzles at the base of the vortex station provides for a spray of the working fluid of the elevated temperature having a sufficient surface area (i.e. where the spray is a fine mist) to allow for the transfer of heat to raise the in flows of air to saturation at a sufficient temperature to provide sufficient release of latent heat to stabilise the vortex against dissipation to great height in atmosphere. Higher temperature air has a higher saturated mixing ratio for all temperatures in atmosphere.

3. Optimising the Vortex

Step 1: Increasing the hot reservoir temperature above that needed to supply the latent heat needed to drive the vortex to the tropopause reduces efficiency in the heat-engine, since it increases the cold reservoir temperature by more than the increase in the hot reservoir temperature. The subsequent drop in efficiency reflects the energy being lost as the vortex dissipates at the tropopause at a higher temperature than necessary. The latent heat needed will vary with atmospheric conditions. If temperature inversions exist at lower levels, the use of saturated air at higher temperatures will be needed to maintain the vortex in rising through those layers. So the temperature is controlled to the minimum required for vortex stabilisation under the atmospheric conditions in force.

Step 2: To extract energy from the vortex it is useful to place turbines (wind turbines) in regions of maximum wind speed, since the power density in the wind varies with the cube of the wind speed.

If sufficient swirl is added to the vortex, a characteristic structure known as a drowned vortex jump will form at the base of the vortex. A DVJ concentrates the wind speed by a factor of better than two, increasing the power density by a factor better than eight. This allows for the use of much smaller turbines to extract the same power. Therefor the swirl vane angle is controlled to supply sufficient swirl to form the DVJ structure.

4. Siting the Turbine for Power Generation

Step 1: The primary turbine is sited in the area of maximum wind concentration within the DVJ. To allow this, vertical turbine blades rotating around a vertical axis in a cylinder of rotation (instead of a disk) are used. This also produces a radial pressure drop across the turbine that acts to prevent the vortex being blown out of the vortex station by side winds. if the pressure drop across the turbine is greater than the dynamic pressure of the side winds, the vortex stays inside the turbine. It is stabilised against lateral displacement.

Step 2: The action of the turbine is assisted by using an annular roof of a varying height, designed to sit in the zone of null poloidal flow (where the air is only moving tangentially). This impedes airflow from going around and over the turbine without otherwise disturbing the flows of the DVJ.

Step 3: The stabilisation of the vortex against lateral displacement is aided by the floor of the station being concave. Due to the effects of inertia in the airflows turning from the near horizontal to the vertical, the vortex will tend to stay at the lowest point of the vortex station floor. This also allows for the draining of the now condensed working fluid (e.g. water) which was provided to the vortex station and sprayed, to be collected via a central drain or a number of drains.

In further detail, characteristics (or conditions) of the in flow or air flow directed to the vortex station can be actively monitored (i.e. at a bulk level), or the monitoring may be more practically made on the basis of the environmental ambient air conditions (e.g. temperature, pressure, humidity (e.g. dry/wet bulb temperatures) and based on those measurements, a determination of an approximate level of the elevated temperature working fluid (e.g. hot water) to be supplied (at its given temperature) can then pumped through the nozzles.

In this manner, the heat flow from the working fluid which is pumped to the nozzles for spraying (e.g. a heated water stream) is the product of its heat capacity, the change in temperature that the working fluid (e.g. water) is cooled by (to reach the equilibrium temperature), and the pumped flowrate. The heat flow needs to be equal to that required to raise the air in the vortex station or the air flow being introduced into the vortex station to the equilibrium temperature (this being a product of air flow rate, heat capacity of air, and temperature change that the air is heated by), and the latent heat required to evaporate sufficient working fluid (e.g. water) to saturate the air. Because the latent heat of water is so much higher than the other quantities, even a relatively small evaporating fraction of the sprayed working fluid (e.g. water) will take a significant part of the heat flow.

Because of this, the required working fluid (e.g. water) pumped flow-rate depends on the heat flow required to heat and saturate the air flow being introduced to the vortex station, divided by the product of heat-capacity, pumped flow-rate and cooling temperature-drop. Accordingly, the greater the temperature drop, the lower the flow-rate required.

If the atmospheric air (which is being provided to the vortex station) has a relative humidity RH>0% then the amount of latent heat required to take the air to RH of about 100% is reduced, so higher atmospheric mixing ratios reduce the pumped flow-rate required of the working fluid (e.g. hot water). Accordingly, based on measurements of the atmospheric air, the quantity or flow rate of working fluid being sprayed in the vortex station may be adjusted to higher or lower levels.

The above control or measurement based control system for determining sufficient quantity or flow rate of the working fluid to be sprayed remains as a suitable approximation as long as the surface area available for the transfer of heat from the spray is sufficient that temperature drops within the liquid phase can be ignored. For this reason, relatively small drop let sizes or fine sprays are useful from the plurality of nozzles. Furthermore, pumping through fine nozzles has a cost implication as more energy is used for the necessary pumping power to pump the working fluid through small apertures of fine nozzles. For this reason, a balance is to be struck between using fine nozzles to achieve small droplet size, yet minimise excess pumping costs. This is one of the practical limits on how low the temperature of the working fluid (e.g. hot water) can be. If the temperature of the working fluid (e.g. water) is too close to the equilibrium temperature needed to run the vortex, the pumping losses involved in facilitating the heat transfer increase towards the useful power that can be extracted from the vortex—which would mitigate the overall increase in efficiency which is sought to be obtained from the vortex station being coupled with a production plant or process.

Alternatively, if there is no active control over the quantity or flow rate of working fluid (e.g. hot water) being pumped through the nozzles, then at least a portion of the sprayed working fluid (e.g. hot water) may simply condense and fall out of the air flow and be collected at the floor by the drain. This is because the latent heat of vaporisation of water is sufficiently high that the fraction of water that must be evaporated to cool it to the equilibrium point is small—of the order of about 5%. The remainder condenses and drops/falls to the floor of the vortex station and is recovered via the vortex station floor drain and can be recycled or returned for use in a production plant or process, for example may be returned to a secondary cooling circuit of a thermal power station. From the point of view of the thermal station operator, the vortex station effectively resembles an evaporative cooling tower which generates electricity instead of consuming it, thereby contributing to an overall increase in energy efficiency.

Further aspects of the invention, which should be considered in all its novel aspects, will become apparent from the following description.

DRAWING DESCRIPTION

A number of embodiments of the invention will now be described by way of example with reference to the drawings as briefly described below.

DETAILED DESCRIPTION OF THE DRAWINGS

Figure 1:
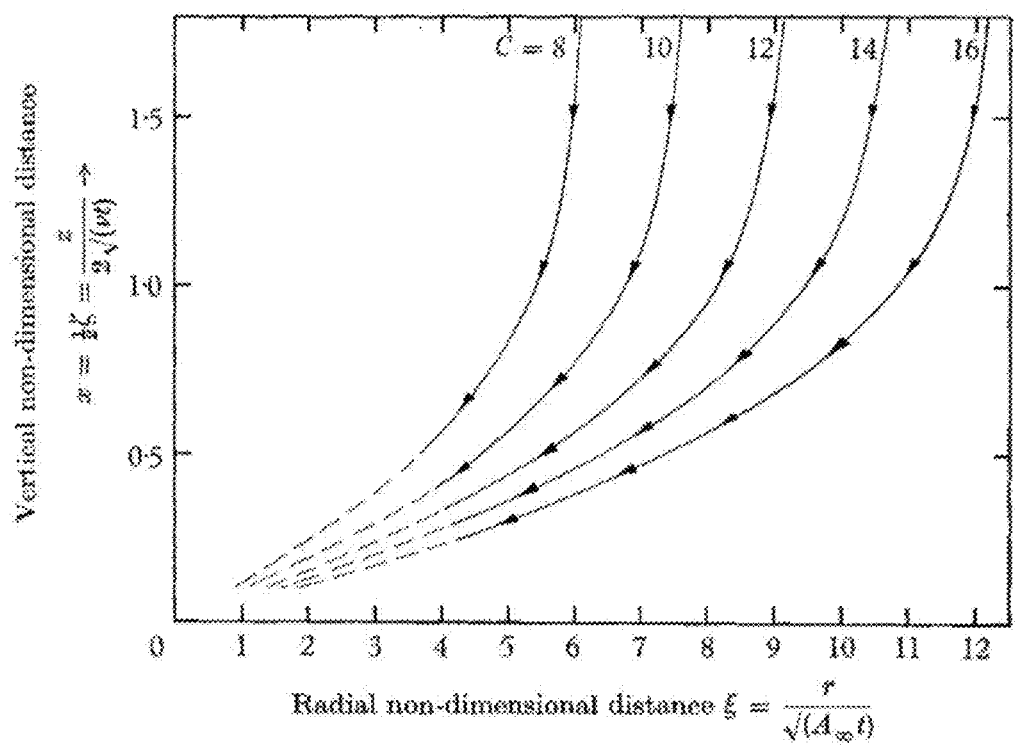
FIG. 1 (prior art) is an illustration of Meridional in flows induced by viscosity and shear near the ground (Barcilon 1967).

Throughout the description like reference numerals will be used to refer to like features in different embodiments.

The inventors have developed an improvement to conventional heat-engine theory to allow an improved prediction of vortex height and consequent thermodynamic efficiency and wind-speeds in atmospheric buoyancy vortices, through a reconsideration of the nature of the cold reservoir of the heat engine. Preliminary modelling suggests an economic and carbon-neutral method of converting waste heat into electricity with an overall efficiency of approximately 5%. Embodiments of a VCV or vortex station are provided and detailed below that are capable of converting waste heat to electricity.

The costs of tall structures and large turbines of the prior art are avoided, since a VCV concentrates the buoyancy power as high wind-speeds at or near ground level. The VCV itself may be very large and may be established at a very low or significantly relatively lower cost than prior art type vortex generating systems. The swirling flows in these rising hot-air columns resist radial motion through hydrodynamic stability and thereby suppress normal turbulent mixing and make energy from buoyancy available to do work at the ground. This action may be exploited or utilised by placing a small wind turbine near ground level in the area of or near to the maximum wind-concentration in the core of the VCV. This is typically at the base of the VCV. Reference to a small wind turbine is made as being smaller relative to an ordinary wind turbine of equivalent power. Suitable wind turbines may comprises of vertical blade type turbines, etc.

Atmospheric buoyancy vortices require a source of buoyancy and a source of concentrated horizontal circulation (hereafter referred to as "swirl"). The dominant source of swirl is concentration of environmental circulation by the end wall effect, which takes place in the boundary layer near the ground as a result of friction at the interface and wind shear above it. Swirl is advected in the core updraft, helping sustain the vortex as it rises.

In temperate conditions condensation is dominant in driving convection but in dry deserts absolutely unstable boundary layers may develop above the desert floor as a result of advection from colder zones and heating (e.g.

radiant heating) from the ground, allowing dust devils to be driven by dry adiabatic convection.

A buoyancy vortex can be considered as containing four zones:
1. Core: a cylindrical volume on a vertical axis with constrained strong cyclostrophic flows and positive buoyancy.
2. Potential vortex: a much larger cylinder on the same axis as the core, containing weaker cyclostrophic flows that can be considered as inviscid, irrotational and neutrally buoyant—diffusion, vorticity and buoyancy can be ignored.
3. End wall disc: the area where the potential flows meet the ground and are subject to the end-wall effect. Significant wind concentration occurs at the centre of the disc.
4. Plume above: the turbulent plume formed down-wind of (above) the core when core restraint breaks down.

Three processes are fundamental in a buoyancy vortex:
I. End Wall Effect
II. Heat Engine
III. Hydrodynamic Stability These processes are treated separately in the literature but operate together so their interrelationships are important. Particularly, the persistence of the vortex to higher altitudes depends upon the hydrodynamic stability of the core wall suppressing turbulent mixing. There is still diffusion of vorticity and heat outwards to the potential vortex around it as the core advects so it 'winds down' with increasing height until the wall can no longer suppress turbulence—at which point the core breaks down to a turbulent plume—unless some other process can overcome the diffusion. Positive axial acceleration in the core acts to resist diffusion of vorticity and heat, since air-parcels are thereby stretched and so reduced in diameter. Conservation of angular momentum and a reduction in diameter act to concentrate vorticity against radial diffusion.

The height to which a buoyancy vortex persists before breakdown to a turbulent plume affects the airflows at the ground since the plume does not contribute to those flows. Energy is instead expended in the plume in lifting and warming of entrained air through turbulent mixing. It is therefore suggested that the plume should be considered as the cold reservoir of the heat-engine driving the vortex flows.

The core may have a one-cell (updraft only) or two-cell structure (a ring of updraft with a central down-draft) depending on swirl strength relative to buoyancy strength and sometimes a breakdown from one-cell to two-cell structure at intermediate height. This is a different phenomenon to the breakdown to a plume. Plume breakdown occurs within the vortex below the plume but appears to be insignificant and hence apparently does not need to be considered to model the heat engine.

The End Wall Effect

The end wall effect biases the cyclostrophic balance (wherein radial pressure gradient is balanced by centrifugal force) in the vortex flows near the ground. The pressure gradient arises from the buoyancy of the core. Friction at the interface and wind shear above it reduce tangential velocity and centrifugal force, allowing air to be drawn in by the radial pressure gradient. Swirl is thus concentrated into the base of the vortex. Many papers have been published examining this effect over a long period. Barcilon 1967 made an analysis of a pre-existing potential vortex under a suddenly imposed kinematic viscosity, using the Napier Stokes equations under a non-dimensionalised analysis to show a meridional recycling of swirl and predict that flows from the potential vortex sink into the end wall disc due to viscosity and acquire inward radial motion as they approach the ground as seen in FIG. 1.

Figure 2:
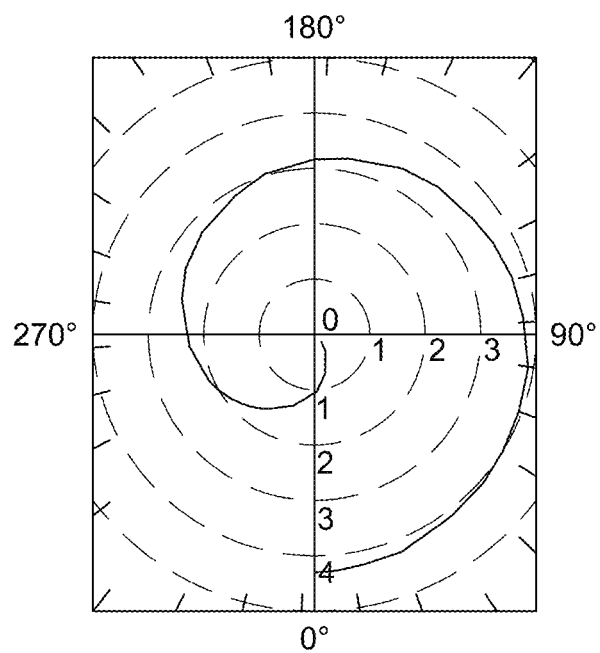
FIG. 2 (prior art) is an illustration of a streamline in plan of air entering the vortex near the ground (Barcilon 1967).
Figure 3:
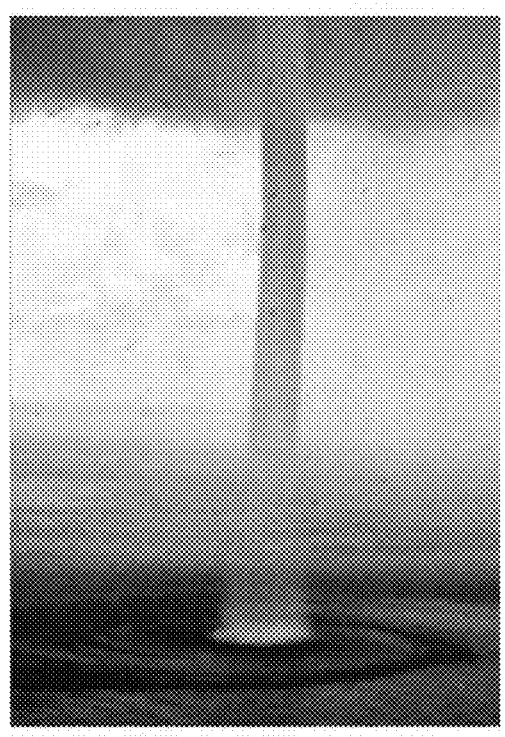
FIG. 3 (prior art) is a waterspout off the Florida Keys (Renno 2008).

The predicted stream-lines shown in plan (from Barcilon 1967) in FIG. 2 are similar to those seen in FIG. 3, a waterspout off the Florida Keys (from Renno 2008) where the in flow is made visible by ripples on the sea.

Figure 4:
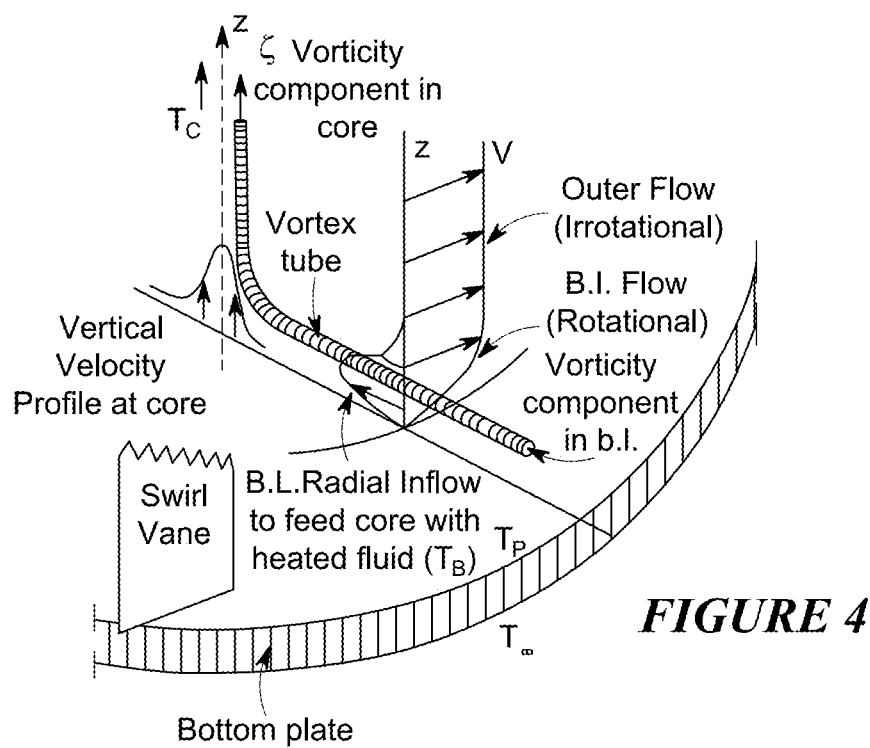
FIG. 4 is a diagram showing concentration of vorticity (Mullen, Maxworthy 1977).

Another way to model the end wall effect is suggested in (Mullen, Maxworthy 1977) by considering advection of vorticity, see FIG. 4, where concentration of vorticity is shown.

More recently numerical analysis using computer models has been possible. For instance (Lewellen, Lewellen et al. 2000, Lewellen, Lewellen 2007) have used LES (Large Eddy Simulation) models to show that turbulence in the end wall disc reinforces the end wall effect and produces wind intensification in the corner flows at the base of the core. This subject has been intensely studied over a long time because of the safety implications of such corner flows in tornados.

For the VCV the inventor believes the implications are the following:
the core should not be put in an enclosure that does not also contain the potential vortex and the ground plane without interrupting the recycling of swirl.
flow intensification in the core is maximised when a 2-cell structure is established just above the ground—referred to as a drowned vortex jump (DVJ). In a DVJ the corner flows at the base of the vortex can have twice the speed of the cyclostrophic flows in the core wall.

The Heat Engine

Figure 5:
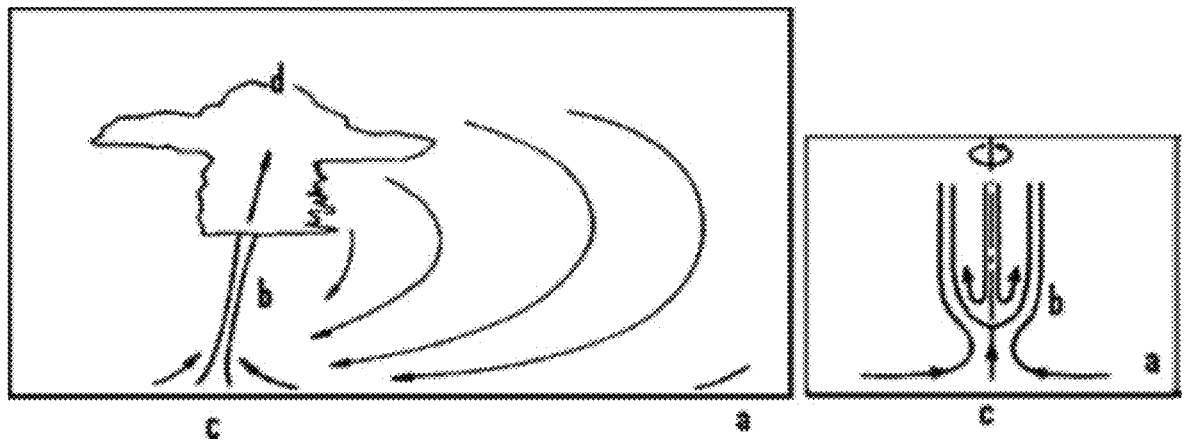
FIG. 5 is an illustration showing vortex circulation (Renno 2008).

In (Renno, Burkett et al. 1998) the authors model the thermodynamics of the convective processes in dust-devils that are responsible for maintaining the pressure differential in the core. They assume any convective phenomenon can be viewed as a heat-engine and consider a dust-devil in quasi-steady state, implying work done by the heat engine balances mechanical friction, in order to model the maximum bulk-thermodynamic intensity of a vortex in cyclostrophic balance. They assume flows are incompressible, heat input is sensible heat flux at the surface and heat output is radiation from subsiding air-flows (at the average temperature of the convective slab). They assume the convective flows are adiabatic, that the engine is reversible and that energy loss through mixing of high entropy updraft air with lower entropy ambient air is implicitly included through the definition of the cold temperature with respect to CAPE. By following an air parcel through a path as shown in FIG. 5, showing vortex circulation, they derive relationships for pressure differentials and cyclostrophic flow velocities.

In (Renno, Bluestein 2001) the analysis is extended to waterspouts. An expression is derived for the pressure differential arising from core buoyancy:

$$\Delta p \approx p_\infty \left\{ 1 - \exp\left\{ \left(\frac{\gamma \eta}{\gamma \eta - 1}\right)\left[\left(\frac{C_p}{R}\right)\left(\frac{T_0 - T_\infty}{T_s}\right) + \left(\frac{L_v}{R}\right)\left(\frac{r_0 - r_\infty}{T_s}\right)\right]\right\}\right\} \quad (1)$$

Cyclostrophic balance is assumed and an expression is derived for tangential velocity at the radius of the core wall using the ideal gas law:

$$V_a = \sqrt{RT_\infty \left\{ 1 - \exp\left\{ \left(\frac{\gamma \eta}{\gamma \eta - 1}\right)\left[\left(\frac{C_p}{R}\right)\left(\frac{T_0 - T_\infty}{T_s}\right) + \left(\frac{L_v}{R}\right)\left(\frac{r_0 - r_\infty}{T_s}\right)\right]\right\}\right\}} \quad (2)$$

where
- Δp is the pressure differential and $p_\infty$ is the pressure at infinite radius and ground level
- γ is the fraction of the total frictional energy dissipated at the surface.

$$\eta = \left(\frac{T_h - T_c}{T_h}\right)$$

is the reversible efficiency of the heat engine
- $C_p$ is heat capacity of air at constant pressure
- R is the gas constant for air
- T is absolute temperature
- $L_v$ is latent heat of vaporisation of water per unit mass
- r is the water vapour mixing ratio
- $T_s$ is the entropy averaged temperature of heating
- a is the radius of the core The papers give estimates of tangential wind speeds in the core wall that are well supported with cited observations for dust devils and more generally supported for water-spouts.

In (Renno 2008) the authors address irreversibility explicitly. They show γ~1 and that pressure drop is greatest in the area of highest velocities just inside the wall. Thermodynamic efficiencies are shown to approach the Carnot efficiency, suggesting irreversibilities are small. The dominant irreversibilities are suggested to be those involved in change of phase. This seems reasonable if the irreversibilities of mixing within the turbulent plume are excluded.

Hydrodynamic Stability and Modified Turbulence

The core of the vortex must be constrained in some way to suppress mixing and make energy available to do work at the ground. This constraint comes from radial hydrodynamic stability in the core wall arising from two factors: cyclostrophic balance and stable stratification of density.

Air parcels in cyclostrophic flow are like satellites in orbit, except that the force providing centripetal acceleration comes from the radial pressure gradient rather than gravity and the air parcels are exerting pressure on each other rather than being in free fall. Under a constant pressure gradient, there is an equilibrium radius for a parcel of constant tangential velocity and radial disturbance away from equilibrium is resisted. Buoyant displacement under centripetal acceleration also acts to encourage a stable stratification of density, with the less dense fluid towards the centre. These effects can combine to produce hydrodynamic stability sufficient to interrupt turbulent mixing at the core wall.

Under normal flow conditions the high Reynolds number at the core wall of a concentrated vortex would produce rapid turbulent mixing of all quantities, including temperature and vorticity, as seen in a turbulent plume (Rouse, Yih et al. 1952, Morton, Taylor et al. 1956). The normal process of turbulent diffusion involves a cascade of scale, whereby all quantities under diffusion are passed from the main flow (the vortex in our case) to smaller eddies and still smaller eddies, with each step of the cascade producing smaller-scale structures with larger surface area to volume ratios, until at the bottom of the cascade the gradient in the properties can be passed on by molecular diffusion. This greatly accelerates diffusion.

Figure 6:
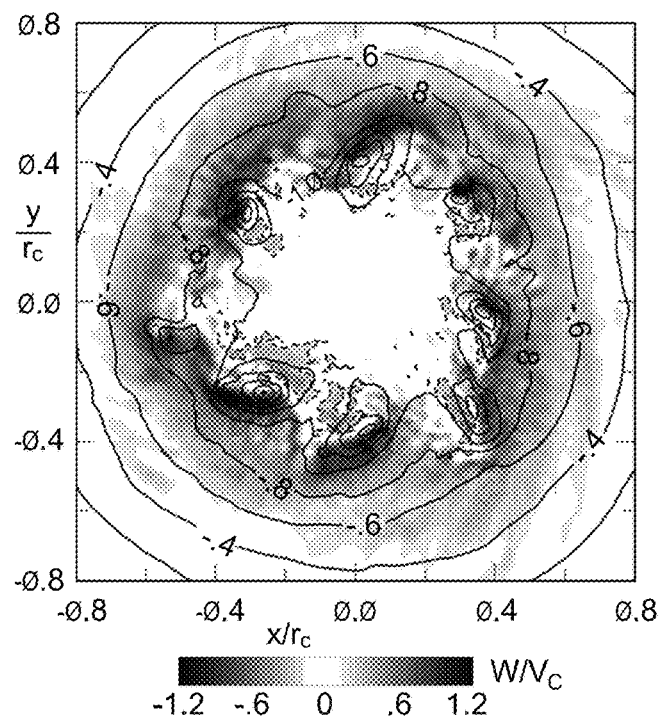
FIG. 6 is an illustration of modified turbulence (Lewellen, Lewellen et al. 2000) pressure perturbation shown in solid lines and vertical velocity in greyscale.

This cascade is interrupted by sufficient hydrodynamic stability in the core wall. Turbulence is not completely suppressed but is much modified. While diffusion outside the core wall is close to the laminar condition diffusion inwards towards the centre can simultaneously be turbulent, as shown in FIG. 6, a cross section of a high-swirl 2-cell vortex LES simulation.

Different criteria for stability have been offered:
- (Howard, Gupta 1962) gave a criterion based on angular momentum.
- (Leibovich, Stewartson 1983) derived a different criterion from separate considerations of three-dimensional perturbations under radial shears in azimuthal and axial velocity.
- (Emanuel 1984) demonstrated that the criteria of (Howard, Gupta 1962) and (Leibovich, Stewartson 1983) are equivalent for a concentrated vortex and that the instability must therefore be inertial in character.
- (Lewellen 1993) suggested the Richardson number criterion of stratified turbulence can be modified for axisymmetric swirling flows to give a criterion for stability that also includes the gradient of potential temperature.

$$\frac{\theta'}{\theta_0} < \frac{2\Gamma'}{\Gamma} - \frac{w'^2 r^3}{4\Gamma^2} \quad (3)$$

where:
- θ is potential temperature
- Γ is circulation
- w is axial velocity
- r is radius
- the prime denotes differentiation with radius, Wall stability is increased with increasing vorticity and temperature gradient, since the temperature gradient at the wall of a buoyancy vortex is negative. In consequence, turbulent energy in the core wall is transformed into inertial waves running in the wall, analogous to Kelvin-Helmholtz instability. As long as the hydrodynamic stability is sufficient to sustain the inertial waves produced (Maxworthy, Hopfinger et al. 1985) the cascade of scale is interrupted and the diffusion of properties in the wall is much reduced (Stewartson, Leibovich 1987).

The question that then arises is how to predict the height to which hydrodynamic stability will allow the vortex to persist before diffusion of vorticity and temperature lead to the breakdown to a plume. (Dergarabedian, Fendell 1967) offers an analysis of vortex intensification and decay based on an asymptotic expansion of the Napier Stokes equations non-dimensionalised with respect to an Ekman number. It is a laminar analysis of a 1-cell vortex but may be useful in modelling the processes of vorticity concentration and diffusion outside the core wall under conditions of modified turbulence. The Ekman number is given by:

$$E = v/\Gamma_\infty \quad (4)$$

where v is kinematic viscosity and $\Gamma_\infty$ is the environmental circulation.

The analysis suggests that for a vortex to concentrate the Ekman number must be much less than one and the product of the area of the updraft and the gradient of average vertical velocity within it must be significantly greater than the kinematic viscosity.

Therefore a large vortex in atmosphere requires only a small vertical acceleration for the core to be sustained and concentrated, but smaller vortices require greater vertical acceleration.

Necessarily Divergent Lapse Rates

A theory of necessarily divergent lapse rates is suggested to explain vortex height in atmosphere for large vortices, which assumes the core persists and advects upwards while CAPE is positive and the core lapse rate is less than the environmental lapse rate. Positive vertical acceleration arises from the divergent lapse rates as the rate of release of CAPE increases with height. Concentration of vorticity overcomes diffusion of vorticity, so the core advects upwards. This is consistent with the theory of potential vorticity (Ertel, Rossby 1949). So a dry buoyancy vortex with an adiabatic core lapse rate is concentrated in rising through a super adiabatic environmental lapse rate and a saturated buoyancy vortex with a pseudo adiabatic core lapse rate is concentrated by the increase of potential temperature in most atmospheres except under temperature inversion. In both cases the vorticity is concentrated as a result of the divergence between the environmental and core lapse rates. Once there is no divergence and no vertical acceleration, the vortex decays to a turbulent plume rapidly, in a height of the order of the diameter from which swirl was concentrated. The turbulent plume, rather than the convective slab, is taken to form the cold reservoir of the heat engine driving the vortex flows.

Evidence from the Literature

Laboratory Experiments

Figure 7:
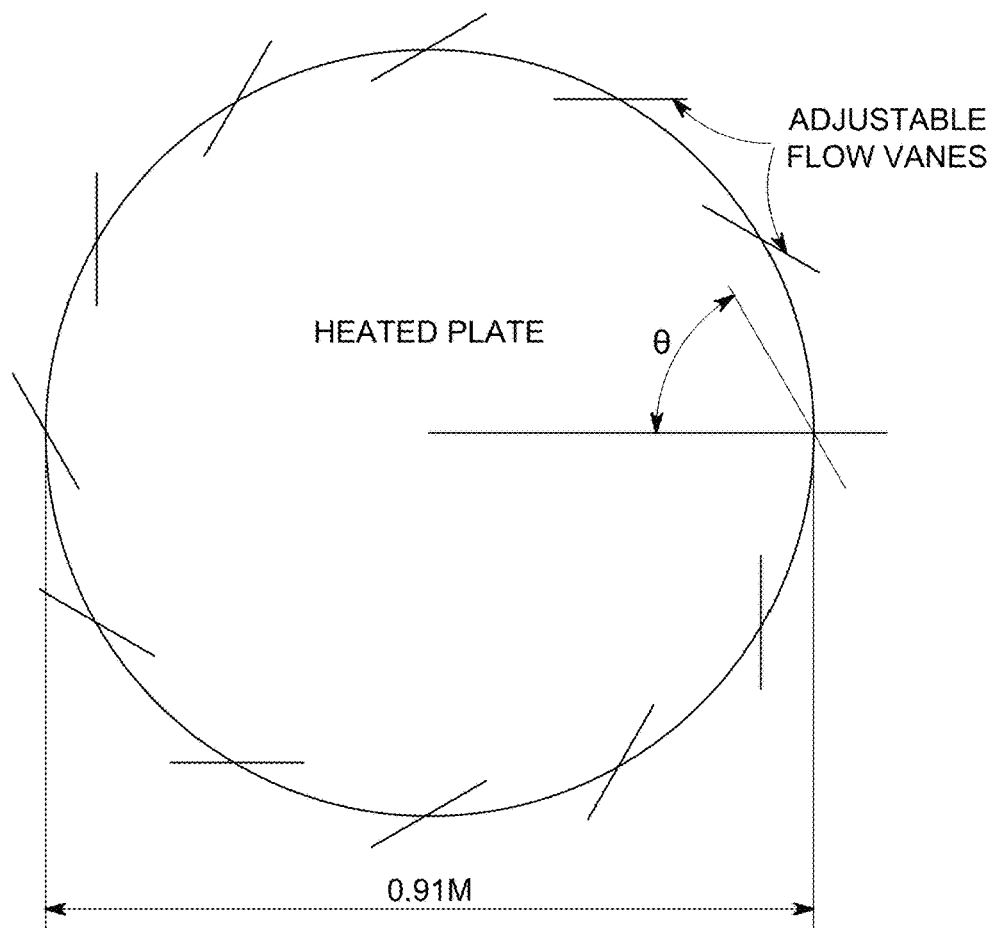
FIG. 7 is an illustration of a vortex-generator in plan that was the subject of laboratory experiments (Mullen, Maxworthy 1977).

FIG. 7 shows a vortex-generator with adjustable peripheral vanes to generate swirl and a heated plate to induce buoyancy as used by (Mullen, Maxworthy 1977). The generator was mounted in a draft-proof cabinet, lightly extracted from above to produce a neutral stratification. Their analysis is based on functional parameters well established in the analysis of turbulent plumes (Morton, Taylor et al. 1956) scaled to power input.

Measurements of velocity were made using neutrally buoyant bubbles and strobe photography. Temperature was measured using sweeping tungsten-wire resistance thermometers.

Figure 8:
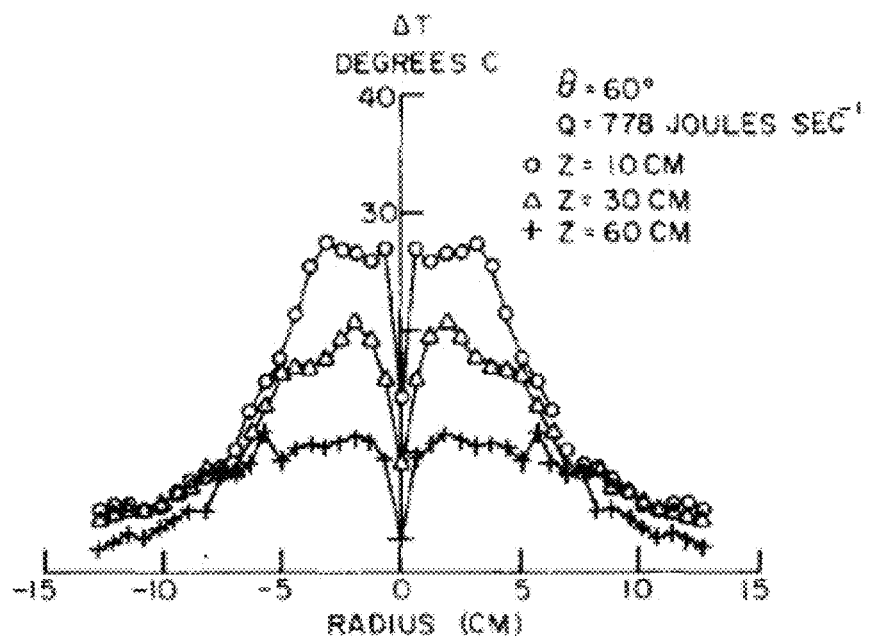
FIG. 8 is graph showing scaled temperature excess vs radius, 60° vane angle, 778 W (Mullen, Maxworthy 1977).

Temperature profiles were derived for a range of vane angles and power inputs, as seen for example in FIG. 8, showing a 2-cell structure.

FIG. 8 shows Scaled Temperature excess vs Radius, 60° vane angle, 778 W (Mullen, Maxworthy 1977).

Figure 9:
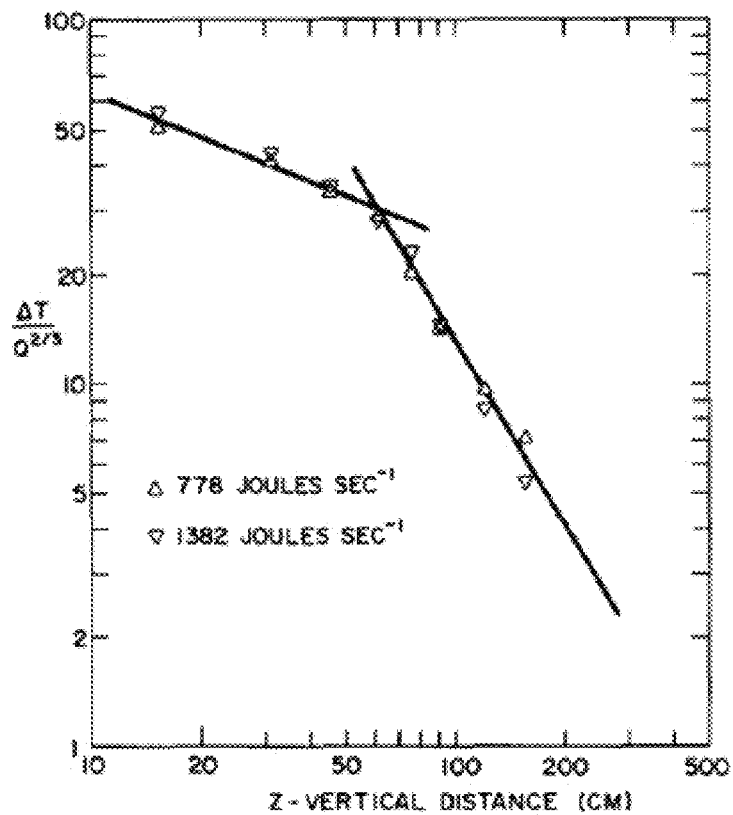
FIG. 9 is a graph showing scaled temperature excess vs height (Mullen, Maxworthy 1977).

FIG. 9 shows the rate of decay of maximum temperature differential (scaled to input power) with height for two vortices. The vortices have different power inputs. One is a 1-cell vortex and the other a 2-cell vortex. They show a common inflection point in their scaled temperature profiles. Above the inflection the profiles show a $z^{5/3}$ dependence, which is characteristic of a turbulent plume. The height of the inflection is approximately equal to the diameter of the swirl vanes in both vortices.

Table 1 shows results from (Mullen, Maxworthy 1977) annotated to show vortices for which the temperature profile is given or can be extrapolated from the paper.

TABLE 1

Circulation Strengths (Mullen, Maxworthy 1977) annotated Vortex circulation strength and core diameter

| Vane angle (°) | 346 J sec$^{-1}$ | 778 J sec$^{-1}$ | 1058 J sec$^{-1}$ | 1382 J sec$^{-1}$ |
|---|---|---|---|---|
| 30 | $\Gamma$ = 968 | $\Gamma$ = 1181 | | $\Gamma$ = 1452 |
| | d = 9.6 | d = 11.5 | | d = 12.7 |
| 45 | $\Gamma$ = 1323 | $\Gamma$ = 1542 | $\Gamma$ = 2142 | $\Gamma$ = 1910 |
| | d = 17.2 | d = 18.4 | d = 17.8 | d = 19.7 |
| 60 | $\Gamma$ = 1865 | $\Gamma$ = 2600 | $\Gamma$ = 2994 | $\Gamma$ = 2916 |
| | d = 19.9 | d = 20.6 | d = 20.8 | d = 21.6 |

TABLE 1-continued

Circulation Strengths (Mullen, Maxworthy 1977) annotated Vortex circulation strength and core diameter

| Vane angle (°) | 346 J sec$^{-1}$ | 778 J sec$^{-1}$ | 1058 J sec$^{-1}$ | 1382 J sec$^{-1}$ |
|---|---|---|---|---|
| 75 | d = 21.8 | $\Gamma$ = 3671 | $\Gamma$ = 4342 | $\Gamma$ = 5445 |
| | | d = 26.6 | d = 25.6 | d = 26.2 |

$\Gamma$ in cm$^2$ sec$^{-1}$ and d in cm.

Tangential velocity is estimated at the core wall, which is taken for this purpose to have the outer diameter of the area of steep radial temperature gradient at the base of the vortex. For instance, FIG. 8 shows profiles for vortex 5 in Table 1, dt=16 cm. In Table 1 d is given as the maximum extent of the bubble-tracks within the core and dt<d. The tangential velocity is then calculated as:

$$V_{ot} = \Gamma / \pi d_t \quad (5)$$

Equation (2) is then used to calculate $V_a$
The friction efficiency is assumed to be $\gamma$=95%
The thermodynamic efficiency is assumed to be $$\eta = \frac{T_h - T_c}{T_h}$$

$T_h = T_\infty + \Delta T_h$ and $T_c = T_\infty + \Delta T_c$
$T_h$ is taken from the given profiles or extrapolations between adjacent vortices
$\Delta T_c$ is estimated from FIG. 9 as being $\Delta T_c = 30 * Q^{2/3}$° C. (scaling to power as used by Mullen, Maxworthy 1977)). This gives the cold reservoir temperature at the point where the core degrades into the plume above.

Using $\Delta T_c$=0 (equivalent to the temperature at the top of the convective layer for a vortex in atmosphere) would overestimate the velocities seen in the experiment, although $\Delta T_c = \Delta T_h / 2$ (equivalent to the average temperature of the convective slab) is a closer approximation. Since the atmosphere in the cabinet is neutrally stratified the vortices breakdown rapidly.

Figure 10:
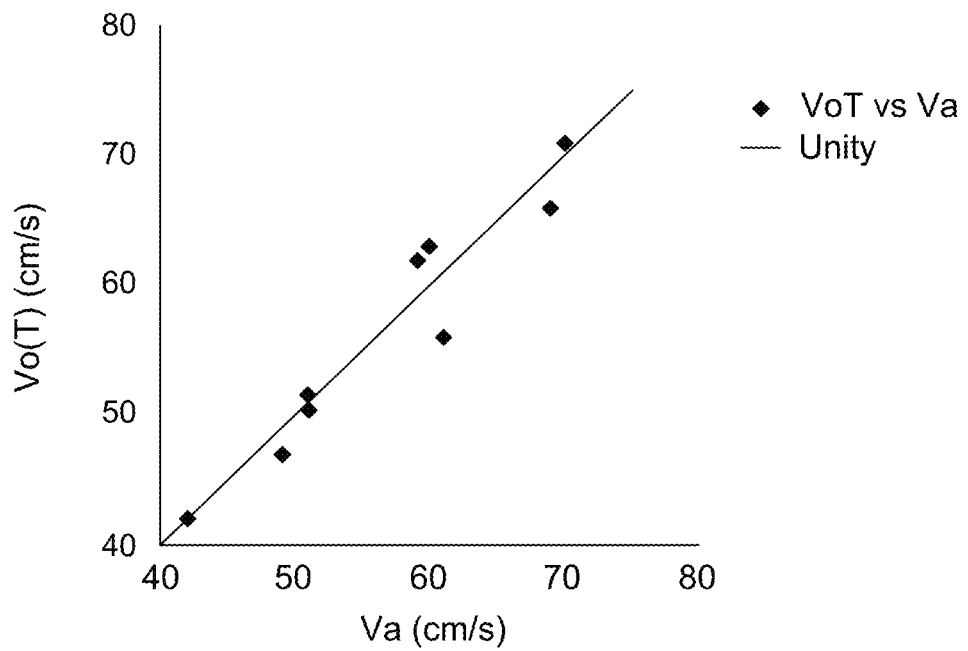
FIG. 10 is a graph showing modelled and measured tangential velocity in the Mullen and Maxworthy experiment using a modification of Renno's heat-engine theory to explain the tangential velocity in the experimental vortices.

FIG. 10 shows the correlation obtained between modelled and measured tangential velocities.

Field Data for Dust Devils (Ryan, Carroll 1970) made a field study in the Mojave Desert collecting data on atmospheric temperature profiles to 1500 m; environmental wind direction, velocity and vorticity; dust-devil diameter, location, direction of rotation, structure and internal wind velocities. Wind velocity is presented as being proportional to the square root of the height of the super adiabatic layer but there is much scatter. This is consistent with the proposed theory.

(Hess, Spillane 1990) made a study of dust-devils occurring in Australia and noted a correspondence in the statistics for dustdevil height (shown in FIG. 11) and vertical velocity variance normalised by the convection velocity w*(Deardorff 1970) (Spillane, HESS 1988) (shown in FIG. 12)— both shown against h, the height of the convective layer This is consistent with the proposed theory.

Figure 11:
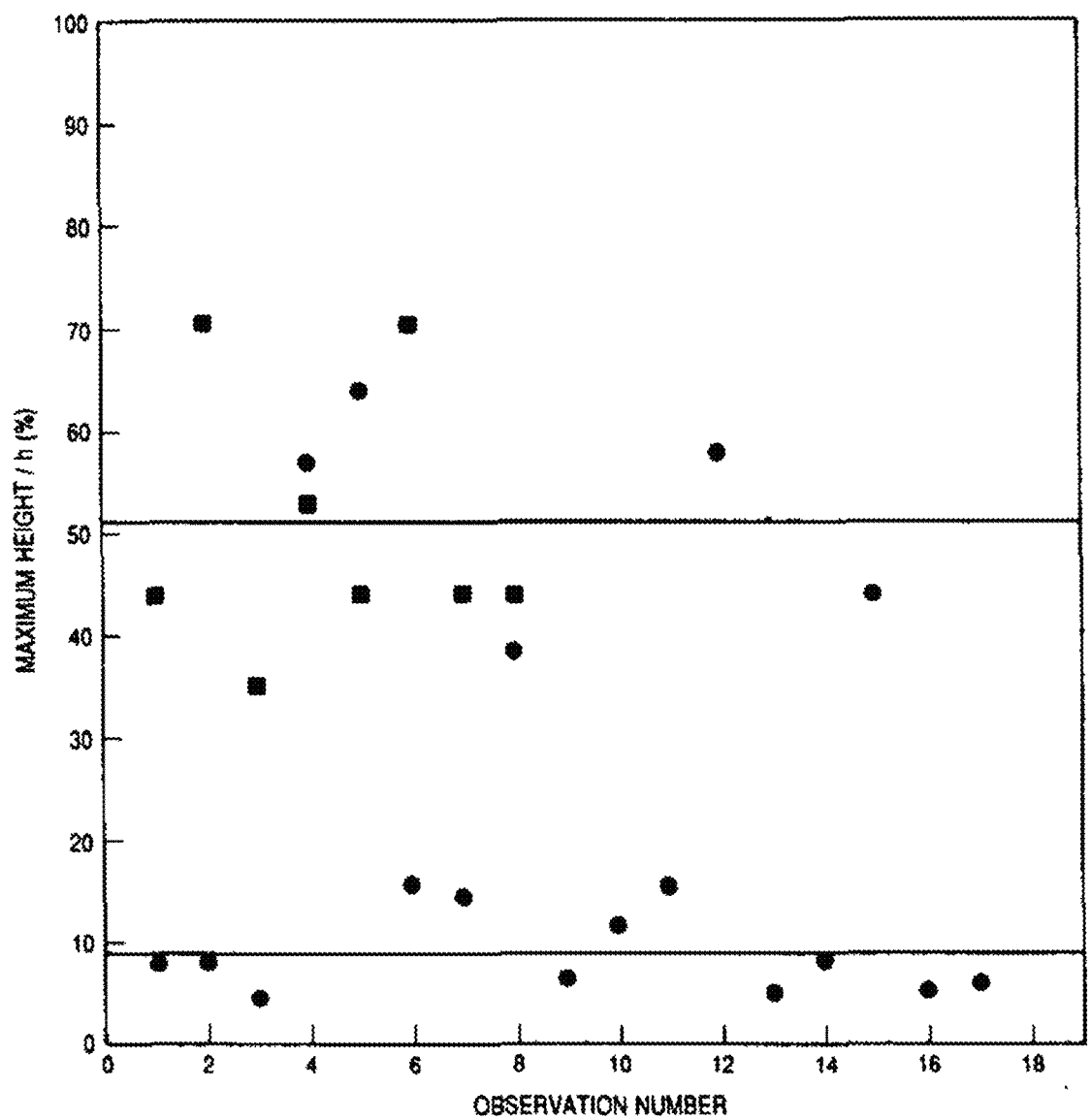
FIG. 11 (prior art) is plot showing heights of dust devils under strong convention (Hess, Spillane 1990).
Figure 12:
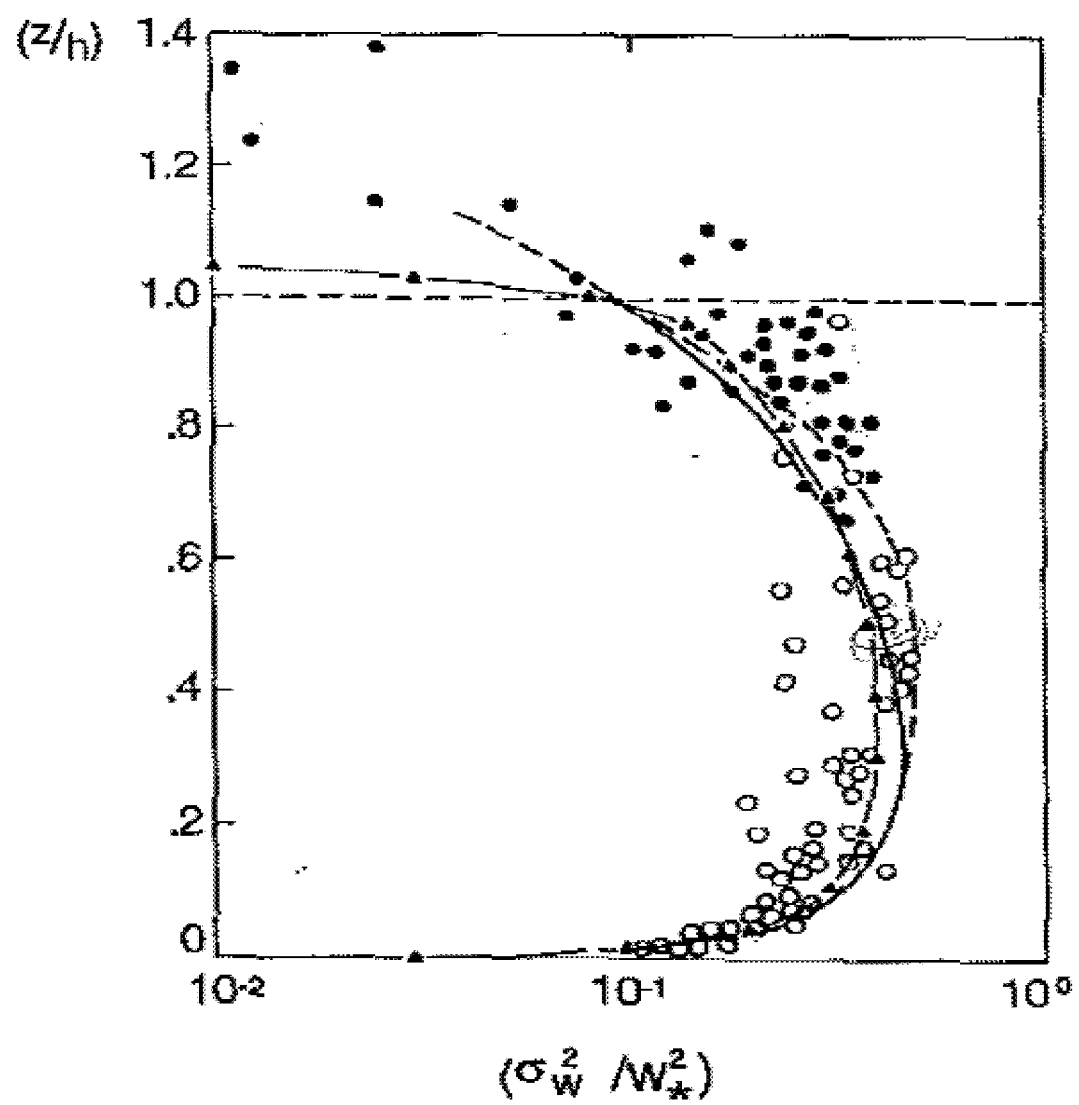
FIG. 12 (prior art) is a plot showing vertical velocity variance under convection (Spillane, HESS 1988).

FIG. 11 shows two populations. The upper population shows a mean height of 0.51 h, which is consistent with the proposed theory if velocity profiles follow FIG. 12. The lower population can perhaps be explained as occurring in a super adiabatic layer formed by radiant heating from the ground.

Figure 13:
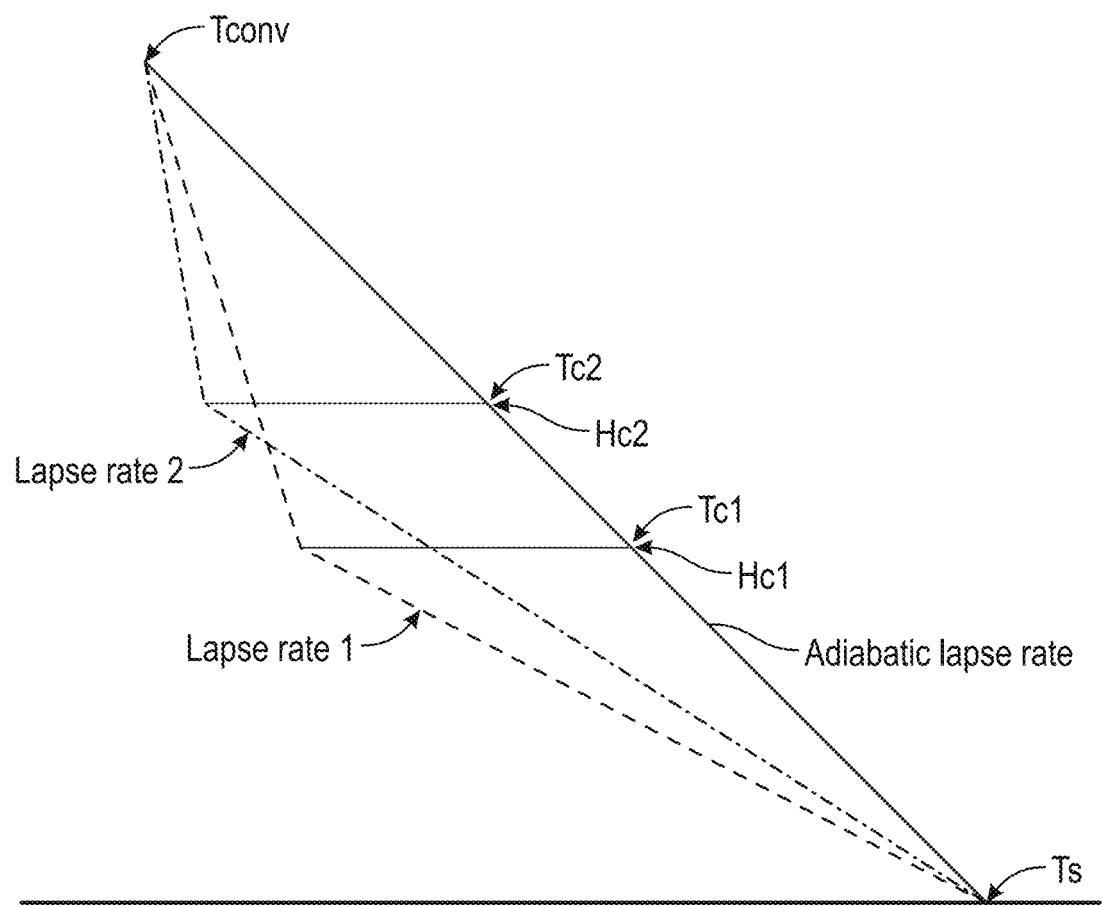
FIG. 13 is a bare tephigram of variation in dust-devil height as a fraction of the convective height, demonstrating the importance of the height of the super adiabatic layer, rather than the height of the convective layer, in predicting dust devil wind speeds.

The theory also explains the variation in dust-devil height seen in the upper population of FIG. 11, as shown in FIG. 13 (in which variation in dust devil height as a fraction of the convective height is shown).

FIG. 13 is a bare tephigram (with the structure omitted for clarity) showing two different atmospheric conditions sharing the same convective height (h). The air is dry so the core air ascends following the adiabatic lapse rate shown in red.

$T_s$ is the surface temperature.

$T_{conv}$ is the temperature at the top of the convective layer.

Two different super adiabatic atmospheres are shown sharing a common height of the convective layer. The first atmosphere is shown in blue. The environmental lapse rate is less than the adiabatic rate until height $H_{c1}$. Assuming the vortex breaks down to a plume at that point, the cold reservoir temperature is then $T_{c1}$.

The second atmosphere is shown in purple. The environmental lapse rate is less than the adiabatic rate until height $H_{c2}$.

Assuming the vortex breaks down to a plume at that point, the cold reservoir temperature is then Tc2. Linear environmental lapse rates are shown for clarity. In reality they would presumably vary monotonically but the argument still holds. So $H_{c2}>H_{c1}$ and $T_{c2}<T_{c1}$ since temperature falls with height. As a result the vortex efficiency is greater under the second atmosphere than under the first and the wind speeds produced are higher, which is consistent with the scatter in the results of the upper population of FIG. 11 and (Ryan, Carroll 1970).

Given the geometry of the tephigram, for dry vortices the mean vortex height will tend to half the convective height, as shown in FIG. 11 and the cold reservoir temperature will tend to the average temperature of the convective slab, as assumed in (Renno, Burkett et al. 1998) but variation around the mean can be expected.

The cold reservoir temperature will thus be higher than the environmental temperature at the height of the plume, since the process lapse rate within the core is less than the environmental lapse rate up to this altitude, so it is inappropriate to assume the cold reservoir temperature is equal to the environmental temperature at the height to which the vortex persists.

The proposed theory suggests that a positive gradient of vertical velocity is necessary to the formation of a concentrated buoyancy vortex, as well as sources of buoyancy and swirl. The inventor believes this explains why such vortices are rare, even where CAPE and swirl are readily available.

Implications for a VCV

Drowned Vortex Jumps (DVJ) and Wind Concentration

The DVJ structure can produce wind intensification of approximately two in a VCV of suitable swirl. The wind speeds produced in the DVJ are high for a vortex of moderate thermal efficiency. The inventors believe the use of a turbine within the area of maximum wind concentration may be more effective than attempting to enclose the vortex and place turbines in an encircling wall. Accordingly, a VCV can be provided with turbines located within the areas of maximum wind concentration.

Pseudo Adiabatic Lapse Rates and Vertical Acceleration

The inventors also believe that, outside of the super adiabatic atmospheres which occur occasionally in dry deserts, concentrated buoyancy vortices can be made to advect high into the atmosphere using a source of saturated air, or saturating at least some of the air being introduced to the vortex or VCV, as the or a source of core buoyancy.

Accordingly, according to an embodiment of the present invention, there can be provided or supplied a source for the saturation (whether as a partial or total saturation, e.g. increasing the relative humidity of at least some of the air being introduced to the vortex or VCV, such as for example from greater than about 0% RH (relative humidity) to about 100% RH) may be utilised to improve or increase core buoyancy. It will be appreciated that the relative humidity may be any value greater than zero, and up to 100% RH, including but not limited to for example: greater than about 0% RH to about 100% RH, greater than about 1% to about 100% RH, greater than about 5% RH to about 100% RH, greater than about 10% RH to about 100% RH, greater than about 15% RH to about 100% RH, greater than about 20% RH to about 100% RH, greater than about 30% RH to about 100% RH, greater than about 35% RH to about 100% RH, greater than about 40% RH to about 100% RH, greater than about 45% RH to about 100% RH, greater than about 50% RH to about 100% RH, greater than about 55% RH to about 100% RH, greater than about 60% RH to about 100% RH, greater than about 65% RH to about 100% RH, greater than about 70% RH to about 100% RH, greater than about 75% RH to about 100% RH, greater than about 80% RH to about 100% RH, greater than about 85% RH to about 100% RH, greater than about 90% RH to about 100% RH, greater than about 95% RH to about 100% RH, More preferably, a 100% RH flow of air to the vortex station is advantageously provided for, which may be achieved by conditioning of the in flow of air being directed into the vortex station, or may be achieved by conditioning of the air once inside of the vortex.

The provision or source of the saturation (whether as a partial or total saturation, e.g. increasing the relative humidity of at least some of the air being introduced to the vortex or VCV), may be achieved by directing a source or supply of relatively warm or heater liquid (e.g. water) to an arrangement which dispenses the warm or heated liquid into the air flow being introduced to the vortex or VCV. The warmed or heated liquid may be optionally actively heated to elevate the temperate to encourage vaporisation of the liquid once introduced to the air flow, or may be indirectly or passively heated, for example using a waste heat stream from a product plant or process, thereby further maximising energy efficiency usage from the production plant or process.

The supply or source of saturation may be temperature controlled, or may have its temperature measured so as to provide an input to a controller to control the quantity or flow rate of the supply or source of saturation to the air flow being introduced to the vortex or VCV. In this way, the supply or source can be actively monitored and controlled based on other measured parameters of the vortex or VCV.

Dry vortices in temperate atmospheres will only advect to a height of the same order as the diameter of the source of circulation that formed them, so will have low thermal efficiencies. Saturated air cools more slowly in ascending as condensation releases latent heat. As condensate will be centrifuged out of the vortex core, the core should closely follow the pseudo adiabatic lapse rate. The pseudo adiabatic lapse rate for a saturated hot reservoir of sufficient temperature is divergent from the environmental lapse rate up to the tropopause, except under conditions of thermal inversion. Additionally, according to (Renno 2008), pressure drop is greatest in the area of highest velocities just inside the wall. On this basis, the inventor believes that any condensation will act to preferentially contribute heat in those areas (by way of releasing heat of condensation when the vapour condenses to a liquid), thereby contributing to further intensifying and stabilising or increasing the stability of the vortex.

Figure 14:
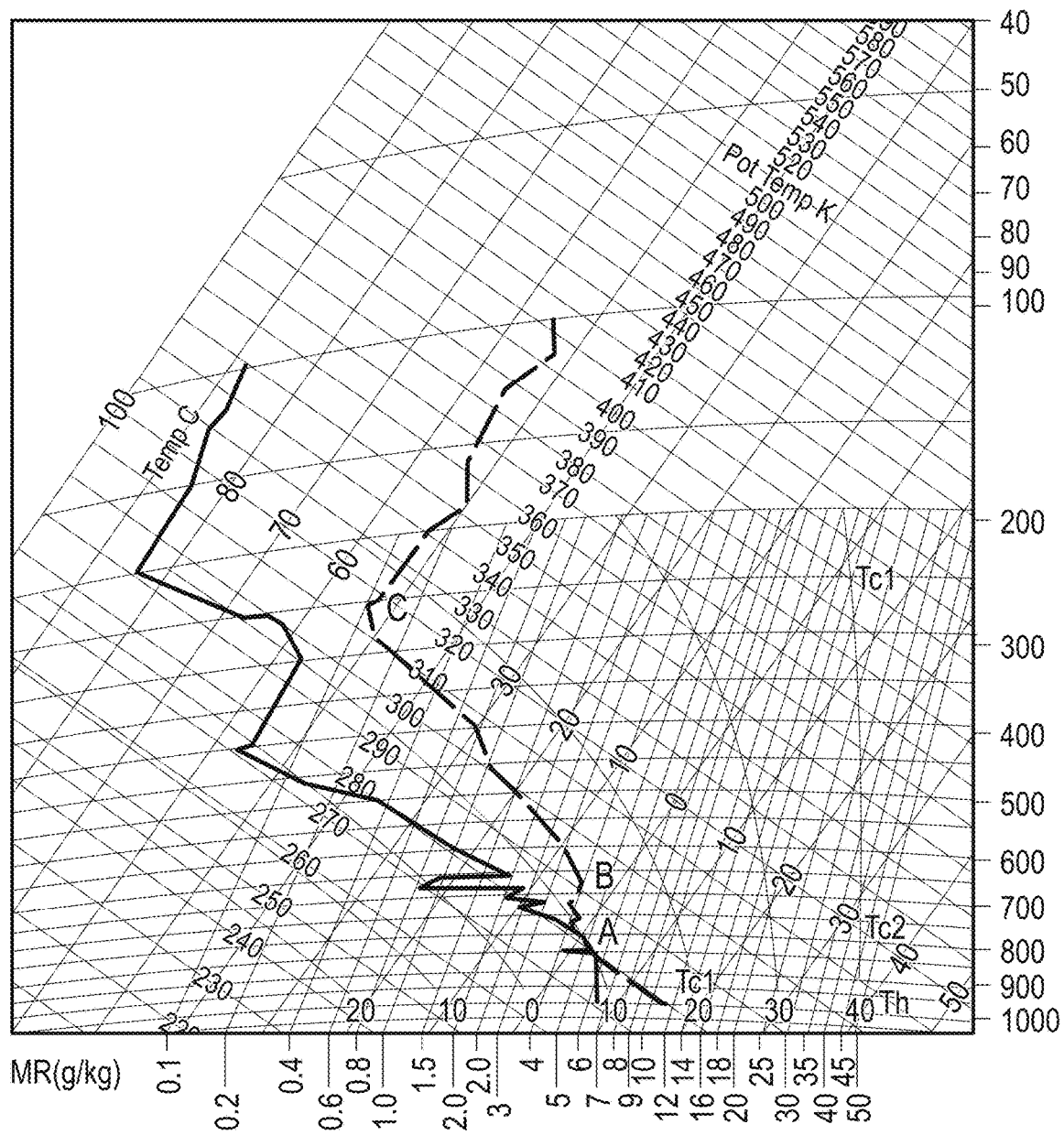
FIG. 14 is an illustration of radiosonde taken at Whenuapai, NZ at 13:00 NZDT on 17 Dec. 2015 (metvuw.com) annotated.

The inventor believes that large saturated vortices will therefore advect high into the atmosphere, until they encounter the tropopause or another significant temperature inversion, as shown in FIG. 14.

Here a vortex is fed with saturated air at $T_h=40°$ C. According to the disclosure herein, the vortex should persist to the tropopause with the core following the pseudo adiabatic lapse rate to $T_{c1}=2°$ C., assuming the vortex can ride through the inversion at A-B. Note that the environmental temperature at the tropopause is shown at point C as negative 50° C.

Other models of buoyancy vortices for power generation (Michaud 2009, Michaud, Monrad 2013) analyse the vortex as a heat-engine running to the tropopause and assume that the cold reservoir temperature is the environmental temperature at that height. This yields estimates of cold reservoir temperature around negative 80° C. and consequently high estimates of Carnot efficiency and conversion efficiency may be achieved. The assumption that a dry vortex will run to the tropopause does not seem to be supported.

(Nizetic 2011) presents a somewhat different analysis based on CAPE and the total enthalpy supplied to the vortex and assumptions on heat-to-work efficiency based on consideration of Carnot and modified Brayton thermodynamic cycles. Again, the cold reservoir is modelled as having the environmental temperature at the tropopause and estimates of efficiency on that basis would be higher than the proposed theory would suggest.

The vortex generation and stability defined by the inventor is at odds with these assumptions and suggests that:
  buoyancy vortices only advect upwards while there is available CAPE and the core lapse rate is less than the environmental lapse rate.
  other than in conditions with super adiabatic environmental lapse rates, as may occur occasionally in dry deserts, this will only produce a vortex to a significant height and moderate efficiency if the core is saturated and thus subject to a pseudo adiabatic lapse rate.
  even if such a vortex persists to the tropopause the cold reservoir temperature is significantly above the environmental temperature at the height at which the vortex degrades to a turbulent plume, since the core lapse rate is less than the environmental lapse rate, by definition.

Preliminary Analysis of a VCV
  Using equation (2) and assuming:
    environmental conditions shown in FIG. 14
    input air to the vortex is raised to 40° C. and fully saturated, so $T_h=T_0=40°$ C. and $r_0=50$ g/kg
    a DVJ structure results with a wind concentration of 2 with a wind turbine mounted in the area of maximum flow concentration
    input airflow follows the streamline in plan of FIG. 2
    the turbine can extract 50% of the mechanical power of the flows through it
    from the sounding $T_1=T_\infty=18°$ C. and $r_\infty=6.5$ g/kg
    friction efficiency $\gamma=95\%$
    temperature of heating is $T_s=40°$ C.
    thermodynamic efficiency $$\eta = \frac{T_h - T_c}{T_h} = 12\%$$

$V_a=119$ m/s, so this is a very powerful vortex even if compared to an F5 tornado, but not as powerful as if the cold junction was at −50° C.

49.2 MW of available waste heat can be converted to an electrical output of 1.9 MW—an overall efficiency of 3.9%—in a VCV of 1.3 m core radius, derived from a swirl-vanes of 13 m radius.

Assuming the water is input at 60° C. and cooled to 40° C., 49.2 MW requires a flow of $F=P_{tot}/(C_w\Delta T)=600$ l/s.

The required pumping power is then $P_p=\mu\dot{V}=345$ kPa*600 l/s=207 kW, based on curves for commercially available dust-suppression nozzles.

A counter-intuitive result of this model is that the thermodynamic efficiency of the VCV increases if the temperature of the saturated input airflow is reduced. The temperature of the cold reservoir falls by more than the reduction of temperature at the hot reservoir (assuming the lapse rate divergence is still sufficient for the vortex to advect to the tropopause) since the pseudo adiabatic lapse rate more closely approaches the adiabatic for lower mixing ratios, as for example seen in FIG. 14:

For $T_h=25°$ C., $r_0=20$ g/kg, $T_c=-25°$ C. so $$\eta = \frac{T_h - T_c}{T_h} = 17\%,$$

$V_a=81$ m/s and overall efficiency is 5.4%
For $T_h=20°$ C., 14.8 g/kg, $T_c=-40°$ C., so $$\eta = \frac{T_h - T_c}{T_h} = 21\%,$$

$V_a=68$ ins and overall efficiency is 66%

This suggests a trade-off exists for the VCV between conversion efficiency and vortex stability under temperature inversion, depending on the temperature of the saturated input airflow.

CONCLUSIONS

A theory of necessarily divergent lapse rates is developed to allow the heat engine theory of (Renno, Burkett et al. 1998, Renno, Bluestein 2001) to be used to explain wind velocities occurring in laboratory vortices and dust devils and statistics of the height of dust devils, by a modification of the assumptions with respect to the cold reservoir. This theory is then used to scale a virtual chimney vortex (VCV) for the purposes of generating electricity from the waste heat available in cooling water streams at existing power stations or from other waste heat streams from product plants or processes (or indeed any heat stream may be used). This suggests that an overall conversion efficiency of approximately 5% is achievable in a VCV. On the assumption that existing power station efficiency is approximately 33%, so the waste heat is twice the electrical output, this implies power station efficiency can be increased by 10% through using such a device. A 1 MW electrical output would be available from a VCV of approximately 2 m core diameter, involving swirl vanes of 20 m diameter.

Vortex Station or VCV Embodiments

FIGS. 15 to 21 show an atmospheric buoyancy vortex, turbines and equipment (vortex station) that enables the buoyancy vortex to be created and for power to be extracted from it.

The figures show one embodiment of a vortex station or VCV that is capable of converting waste heat into electricity.

According to the disclosure herein, at least one, or optionally a plurality of, wind turbines are preferably placed at or near ground level in the area of maximum wind-concentration in the core of the VCV that is preferably at the base of the VCV.

In some embodiments a plurality of concentric turbines may be used, or simply one turbine with many concentric blade sets.

Hereinafter, reference to "turbine" may refer to one or more turbines.

In the prior art, often vortex engines typically require a costly vertical cylindrical wall surrounding an arena to create the vortex and they make no use of condensation to produce a gradient of vertical velocity to stabilise and concentrate the vortex.

According to the disclosure herein, the VCV provides an apparatus and mechanism or process for providing or supplying a source of liquid to either partially or fully saturate an air flow being introduced or fed to a vortex or a VCV so as to use subsequently utilise the released energy of latent heat of condensation of vapour added to the air flow of the vortex, which in turn contributes to the production of a gradient of vertical velocity for stabilising or increasing stability and concentrating the vortex. As a result, a man-made vortex can be generated that achieves relatively high aspect ratios.

Further, the vortex will concentrate if the action of axial strain (or a vertical gradient of vertical velocity as it might otherwise be termed) in concentrating the swirling flows exceeds the action of turbulent mixing of momentum and heat in diffusing them.

The vortex stability arising from sufficient hydrodynamic stability in a concentrated vortex acts to suppress turbulent mixing. Therefore, for a concentrated vortex, lapse rate divergence (wherein the core cools more slowly in rising than the surrounding air) acts to maintain the vortex in rising against the action of diffusion, thereby allowing a vortex with a relatively high aspect ratio to develop.

In the absence of axial strain, a columnar vortex above a ground plane has an expected aspect ratio of about 15:1, the height to the plume being about 15 times the core diameter, due to momentum considerations. Dust devils running in an atmosphere with super adiabatic lapse rate can run to aspect ratios above 400:1, limited only by the depth of the super adiabatic layer that provides lapse-rate divergence in the dry condition.

By using saturated or at least partially saturated core air flows the core cooling can be slowed down to the pseudo adiabatic lapse rate, as condensation releases latent heat. In this way lapse rate divergence and subsequent axial strain can be maintained to a greater height; potentially to the tropopause, which is in the order of 10 km above ground.

The ability of air to carry water vapour in solution declines as pressure and temperature reduce. Therefore, it is not necessary to raise the incoming air to saturation or 100% relative humidity at the ground, only to create a mixing ratio high enough that saturation occurs and condensation, lapse-rate divergence and axial strain come into effect before the rising vortex loses the stability created by the end wall effect and heating occurring at the ground. On this basis, the supply or source of the saturating liquid can be controlled so as to provide a sufficient quantity or flow rate to provide for a condensable liquid as a vapour to the air flow, and for that sufficient quantity to provide energy to the vortex, via the latent heat of condensation.

Given the expected aspect ratio for a vortex in the absence of axial strain, thus smaller vortices require air that is near to 100% RH at the ground. While larger vortices will concentrate with a ground level feed of airflow at less than 100% RH, as long as the RH will reach 100% at a height less than the core height that arises without axial strain. So while a cyclone runs with air at a comparatively low RH, while the VCV as disclosed herein may utilise a source or supply of heated water which is subsequently pumped through one or more nozzles or spray devices to achieve a relatively saturated air flow substantially at or near the ground or base of the vortex.

In one embodiment, the temperature for the supply or source of saturation (e.g. water using in the vortex station of the present invention arises from two considerations.

1) As shown in FIG. 14, ordinary atmospheres contain bands or layers of stability such as that shown at A-B. Saturated air starting at the ground at $T_h=40°$ C. will rise along the pseudo-adiabatic curve shown through $T_c2$ to $T_c1$, thus maintaining lapse-rate divergence and vortex stability up to the tropopause, which appears at 250 mbar. $T_c1$ give a Carnot efficiency of $$\frac{T_h - T_c1}{T_h} = 12\%$$

In a similar atmosphere, but lacking the stable layer at A-B, lower temperatures of saturated air could be used. In the extreme, $T_h=20°$ C. would give a core following the pseudo adiabatic. Now Tc1=−40° C., so $$\frac{T_h - T_c1}{T_h} = 21\%$$

since the cold reservoir temperature falls by more than the imposed change in the hot reservoir temperature. So there is a trade-off between the higher efficiency at low core temperature versus the higher core stability at high core temperature, which would require control of the core temperature in use, depending on atmospheric conditions.

2) For a desired core air temperature the volume of water that must be pumped through one or more nozzles or sprayer devices depends on the water temperature. The heat content of the source or supply of saturation (e.g. water flow) under the temperature drop it goes through to equilibrium must equal the heat flux involved in evaporation or vaporisation and warming of the air flows to the equilibrium temperature.

So for a saturated air flow to the vortex at about 40° C., the water flow rate needed for water fed at about 50° C. is twice that for water fed at about 60° C., assuming the water is cooled to about 40° C. in both cases. For a lower temperature differential from water to air, a finer mist is needed to allow for the heat transfer rate required. These effects combine to increase the pumping losses incurred in driving the vortex with cooler water.

For the vortex station of one particularly embodiment, the temperature of the source or supply for partial or complete saturation (e.g. water supply) is about 60° C. with about 50° C. being a practical lower limit for power generation purposes. If net power output is not the primary concern in applications such as transporting polluted ground air to height or raising moisture to height for rain enhancement, a lower water feed temperature is allowable.

Accordingly, for the present invention the working fluid (e.g. water stream which is heated) may be provided at a temperature of greater than about 40° C., or may be greater than about 45° C., or may be greater than about 50° C., or may be 60° C. or more, A secondary water cooling circuit of many existing thermal power stations often contains large quantities of waste heat in water flows above 60° C., which are typically otherwise sent to evaporating cooling towers. Thus the vortex station of the present invention could utilise the heat from such heated waste water streams.

Nozzles or Sprayers

The nozzles or spray devices may be located in the in flow or air flow being introduced to the vortex, just above the ground or at the base of the vortex, and preferentially while under the roof, to encourage the vortex to start or initiate. Once the vortex has been started or initiated, extra nozzles or spray devices still in the in flow at the ground or at the base of the vortex but radially further out from the centre or core of the vortex may be used for providing or supplying the source of saturation (e.g. water).

The nozzles or spray devices do not need to be angled so that the sprayed liquid is fed into the vortex with angular momentum, but may optionally be configured to do so. Angular momentum of the vortex is primarily generated from the vanes at the periphery of the vortex station.

High Aspect Ratio

The aspect ratio is the ratio of the height of the vortex plume to the diameter of the core.

The core diameter is considered to the diameter of maximum tangential wind speed—measured with an anemometer or a laser (PIV). The height of the vortex used for the aspect ratio (Γ) is from the base to the head of the core, which is where the core starts spreading out (i.e. when the core turns into a turbulent plume).

The efficiency of the heat engine depends upon the Carnot efficiency $$\frac{T_{hot} - T_{cold}}{T_{hot}}.$$

$T_{cold}$ is determined by the height of the vortex and the lapse rate is set by the properties of air. The height depends upon maintaining vortex stability in rising against the effects of turbulent diffusion of heat.

In one embodiment, a vortex 2 is created at the vortex station 1 by pumping water, preferably hot, through a manifold of nozzles 3 situated beneath an annular roof 4, in order to create flows of warm, saturated air 5, which forms the vortex 2. This air 5 is buoyant relative to the surrounding atmosphere because it is hotter and contains more water vapour (water vapour is less dense than air) so it rises up the vortex 2 and air 6 is drawn in at the ground to replace it. Such an arrangement is for example shown by FIGS. 15 and 21.

To help initiate or start the vortex, the nozzles or spray devices are configured to produce a relatively fine droplet of water to produce a suitable heat-transfer area and Nusselt number high enough to approach saturation of the air flow the water is being introduced into. As the vortex builds strength, wind shear then assists to automatically break-down larger water droplets, so coarser nozzles or spray heads or spray devices and lower pumping pressures (with lower pumping loses) are possible in normal running, thereby further helping reduce the energy demands of running or maintaining the vortex.

Swirl is preferably imparted to the in drawn air (or air introduced to the vortex) 6 by drawing it through vanes 7. Preferably the vanes 7 are inclined at an angle to the radial, set in a surrounding circle around the vortex (termed a "swirl-henge"). The angle at which the air enters is set by the angle of the vanes.

The vanes may be formed using yacht-sail technology (i.e. for example may be flexible materials) as these can provide a low cost vane set up. The vanes may be reconfigurable or adjusted as to angle or their shape. In other forms the vanes may be made of composite material(s).

Figure 19:
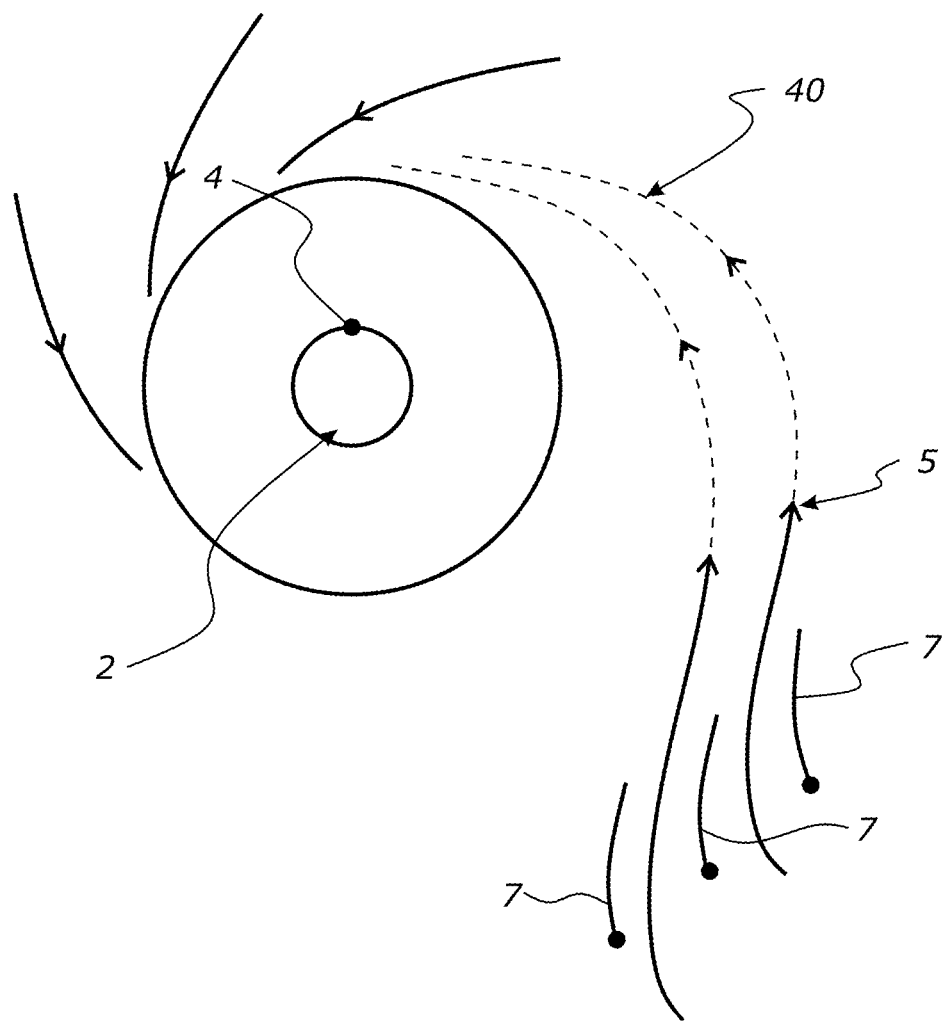
FIG. 19 shows airflow through vanes in the vortex station of the present invention.

A small section of the swirl henge, is for example shown in FIG. 19, but in use, the swirl-henge completely surrounds the base of the vortex 2, so all input air acquires swirl in being drawn through the swirl-henge.

The annular roof 4 is preferably placed in the null-flow zone of the meridional circulation (that is circulation that is occurring in one vertical half of a cross section including the centreline), which is characteristic of a drowned vortex jump (DVJ) flow-field 20 (see FIG. 16) which occurs spontaneously in vortices of sufficient swirl. By constructing the roof 4 in the null flow zone 21, the roof is made or configured so as to restrict the airflows at the point of maximum wind concentration 22, at the base of the vortex station.

At least one turbine 8 is situated at the centre and at the ground 9 of the vortex station 1.

The turbine(s) is preferably a turbine with vertical blades moving around a vertical axis (similar to a Magnus-type turbine). The vertical blades may be fixed or adjustable.

The roof 4 is configured to restrict airflows into the vortex station and causes them to pass through the turbine(s) 8, without distorting the corner flows of the DVJ, which produce the wind concentration at the point of maximum wind concentration 22. When the turbine(s) is placed in the area of maximum wind concentration 22 (at or near the ground 9 of the vortex station 1) maximum power extraction can be achieved. Also, the use of such a turbine produces a radial pressure drop in the in flow 22, which acts to stabilise the foot 11 of the vortex 2 against being disturbed laterally, for instance by an external wind.

The figures will now be described in further detail.

Figure 15:
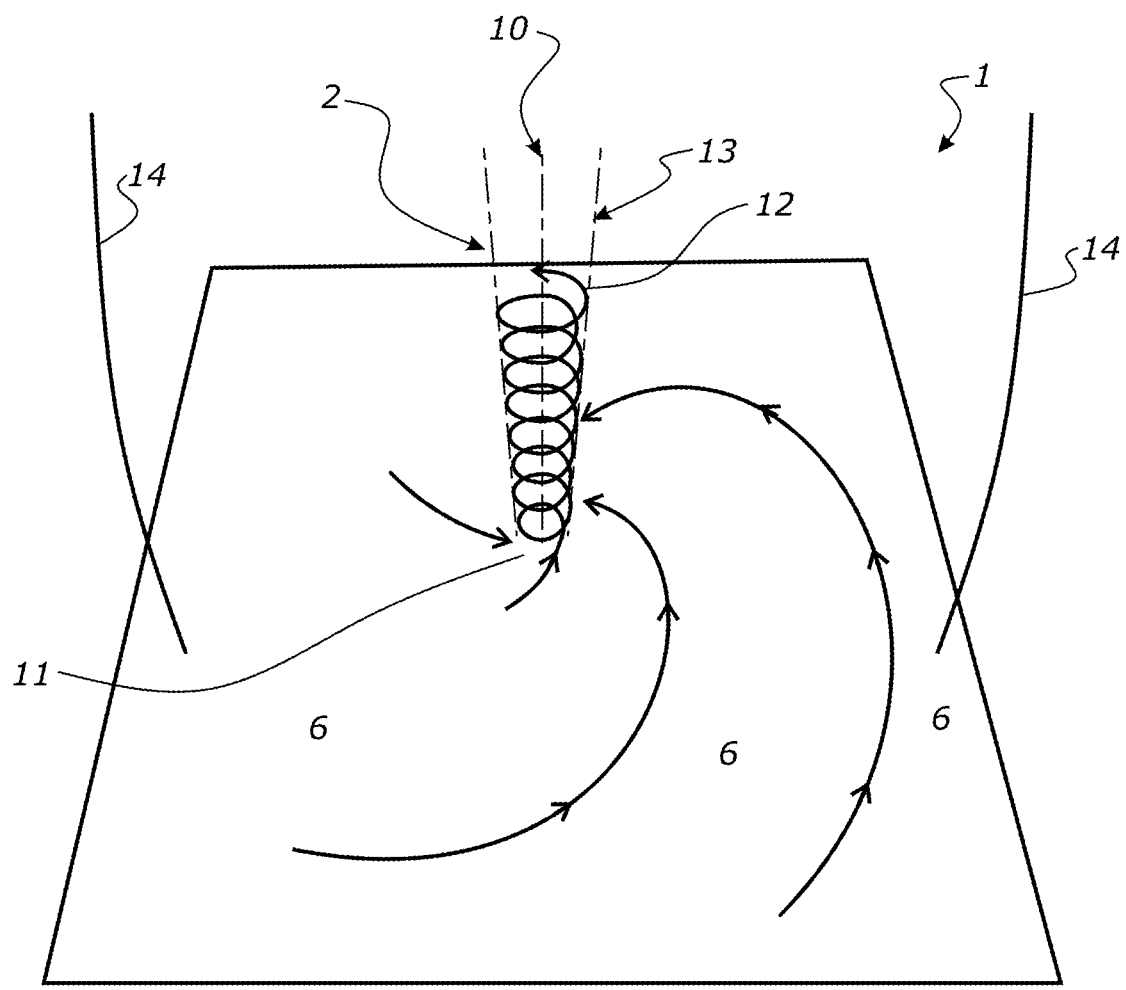
FIG. 15 is a diagram of the vortex station of the present invention.

In FIG. 15 there is shown an embodiment in which air 6 is drawn into the vortex 2 through the end-wall effect. Airflow is concentrated at the base 11 of the vortex 2 and the path of an air parcel rising in the core can be tracked through the vortex (by the arrow indicated as 12). The core wall is shown in FIG. 15 by the dashed line indicated as 13, and the core has a centre indicated as 10. The airflows going around the vortex core (the potential vortex) are indicated by the outer extent of the potential vortex 14. In the core of the vortex the airflows tangential velocity is greater than axial velocity which in turn is greater than radial velocity.

Figure 16:
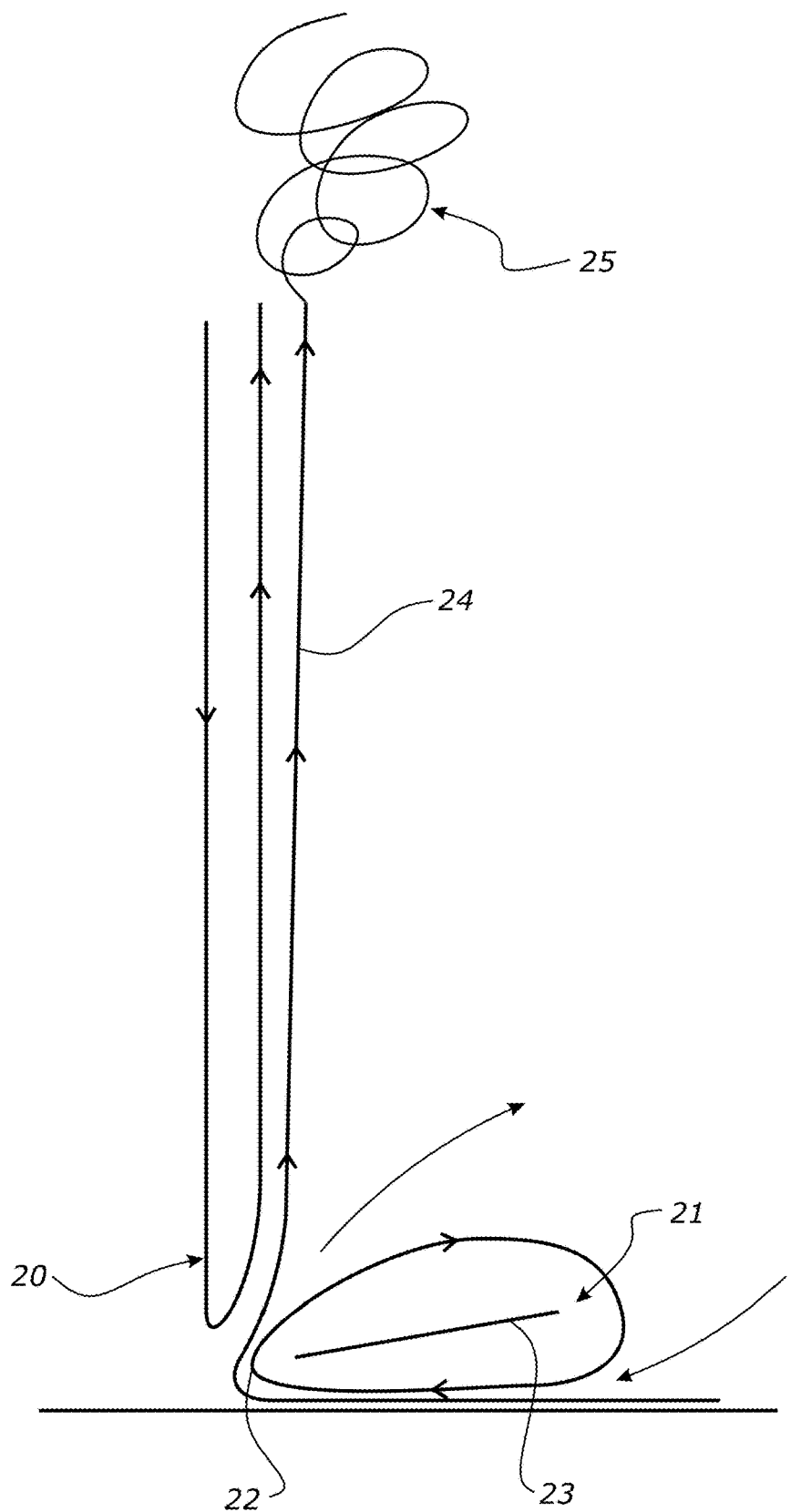
FIG. 16 is a diagram showing core advection and meridonial flows in the vortex station of the present invention.

FIG. 16 shows core advection (without vertical acceleration) and meridional flows in a vortex station of the present invention. The area 22 is of maximum wind speeds within a drowned vortex jump (DVJ) structure. The line indicated as 23 is the line of null meridional flow. Line 24 indicates the area of the vortex with a hydro dynamically stable core wall. Here vorticity is diffusing outwards to the potential vortex through molecular diffusion. Flows outside the wall are near laminar. Core diameter is near constant but expanding slowing with height as the vortex is winding down (as vorticity and tangential speeds reduce). At 25 dynamic stability is now insufficient to suppress turbulence, so the core breaks down into a turbulent plume. The height of breakdown (h) is of the same order as the diameter of the swirl henge (D).

Figure 17:
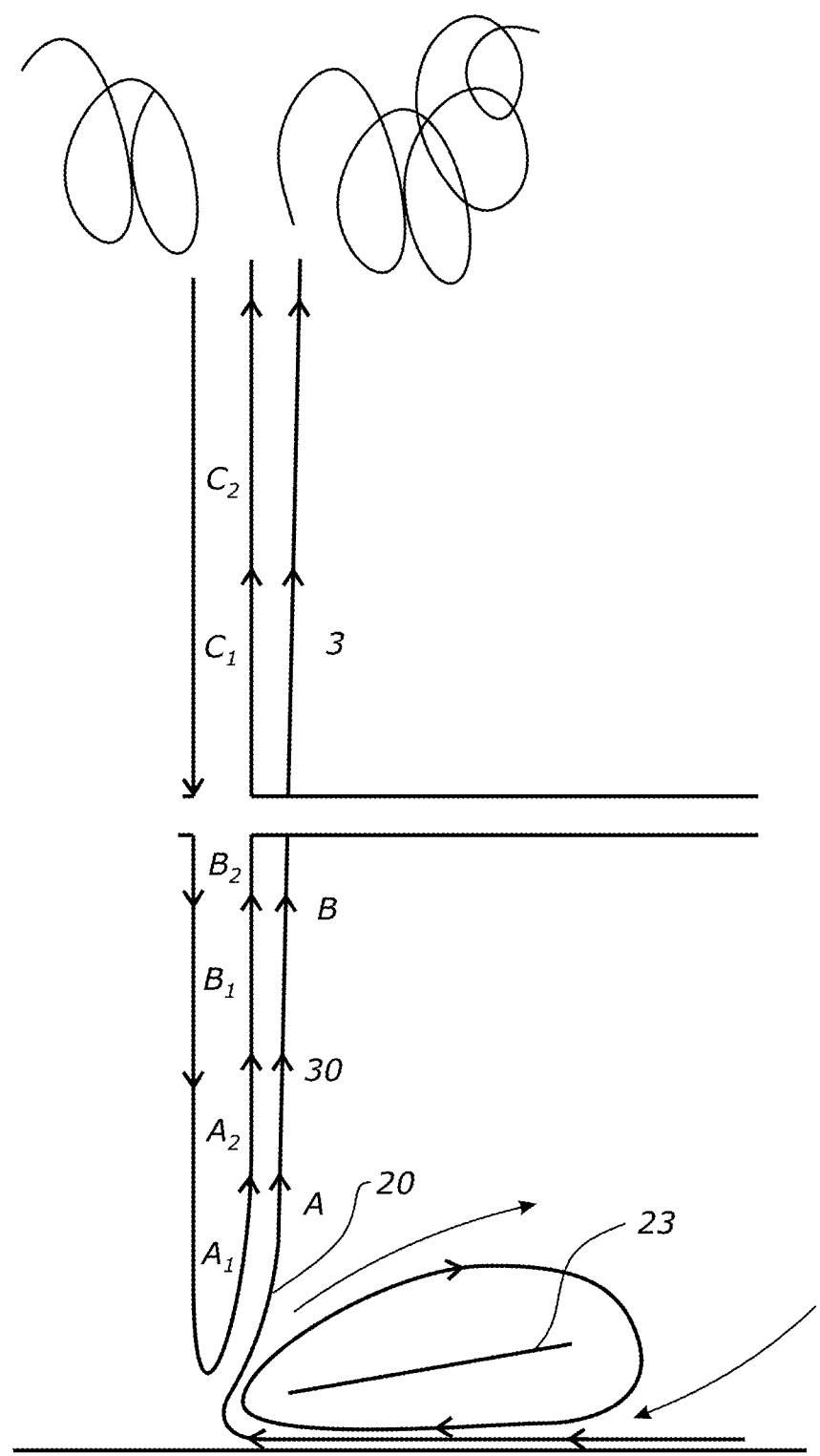
FIG. 17 is an illustration showing core advection with sufficient vertical gradient of vertical velocity from condensation for the vortex created in the present invention.

FIG. 17 shows core advection with sufficient vertical gradient of vertical velocity from condensation. Diffusion of vorticity is matched at area 30 by concentration of vorticity. As an air-parcel moves from A to B it accelerates. The top accelerates more than the bottom; $A_1 \to B_1 \to C_1$, $A_2 \to B_2 \to C_2$, so it is stretched and becomes thinner and there is reduced diameter and conserved angular momentum which concentrates vorticity. The core diameter is therefore constant or reduced in rising from area 30 to area 31. The vertical scale 32 of the vortex is fore-shortened here. The vortex core may then advect to the tropopause, at approximately 10 km altitude. Advantageously, a sufficient quantity or flow rate of water in the form of evaporated or vaporised moisture (for saturating either completely or partially an air flow being added to the vortex) is added to the vortex, such that the latent-heat being released by condensation of that moisture is sufficient to provide acceleration to overcome diffusion of vorticity, the core advects. At the tropopause, or other significant atmospheric temperature inversion, acceleration is removed and the core 'winds' down. The winding down of the vortex is shown as 25 in FIGS. 16 and 17.

Figure 18:
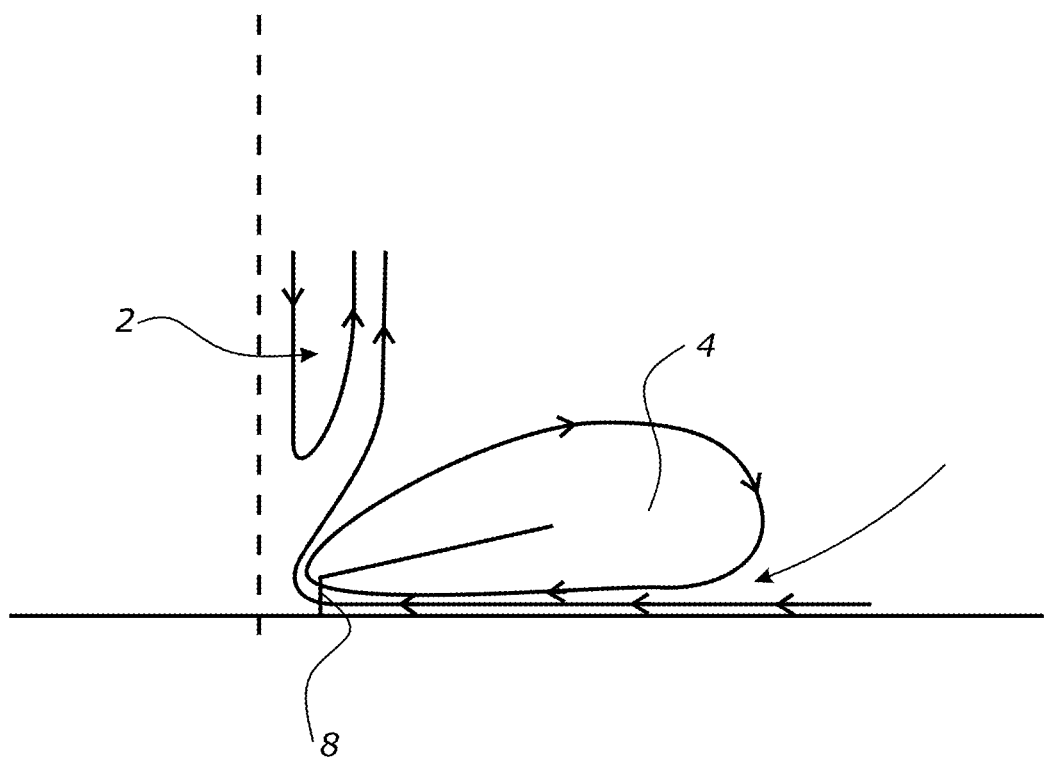
FIG. 18 shows part of the vortex station of the present invention.

In a further embodiment, FIG. 18 shows part of a vortex 2. A single turbine 8 is shown here, but a plurality of turbines could be used in a full system. Preferably the blades of the turbine are mounted vertically and rotate around the vertical axis of the vortex 2. Preferably the pressure drop across the turbine 8 is radial and acts to intensify the vortex by increasing the pressure reduction in the core, which avoids destabilising the vortex and resists lateral displacement of the core base, for instance by wind; thus the core cannot be blown away.

In another embodiment, FIG. 19 shows airflow through the vanes and into a vortex. As described above, the "swirl-henge" 7 vanes are in effect airfoils (preferably using yacht-sail technology). Swirl is imparted to the input airflow as it is drawn in at the vanes 7. In area 40 (along the vertical axis of the vortex 2) swirl is intensified by the end-wall effect. Heat is added to the input airflow by pumping water (preferably hot) through nozzles to produce sufficient surface area for heat-transfer to produce a saturated or partially saturated air-flow to the core, underneath the roof 4 and on the ground plane. Preferably the vertical turbine blades rotate in a circle at the inner diameter of the roof 4.

Figure 20:
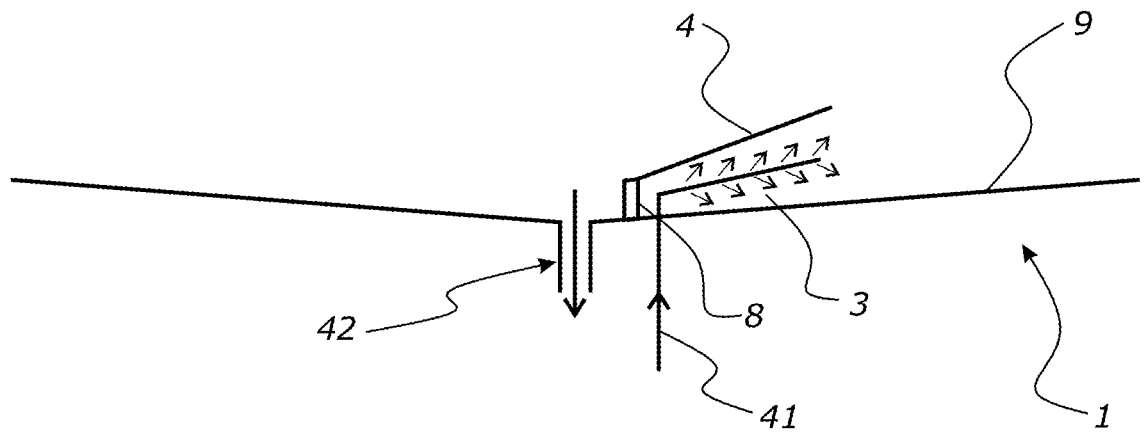
FIG. 20 illustrates water flows in the vortex station of the present invention.

In another embodiment, FIG. 20 for example shows water flows in a vortex station. A water supply 41 (of preferably hot water) is pumped into the vortex station 1. Nozzles 3 direct the water into and against the in flow of air, to produce a fine mist or spray with a relatively large or great surface area for heat and transfer of the mist or spray into the air flow in the form of vapour or as an evaporation of the water. Most of the water sprayed or otherwise jetted into the vortex falls out of the vortex as condensate and is carried or directed to a central drain at 42 for collection and recycling. The drainage of water is assisted by the vortex airflow and by having a concave floor 9 on the vortex station 1.

Advantageously, the concave floor of the vortex station may also contribute to a stabilisation of the vortex because the air flow goes through a change of greater than 90°—and so higher acceleration of air flows are resultant.

Figure 21:
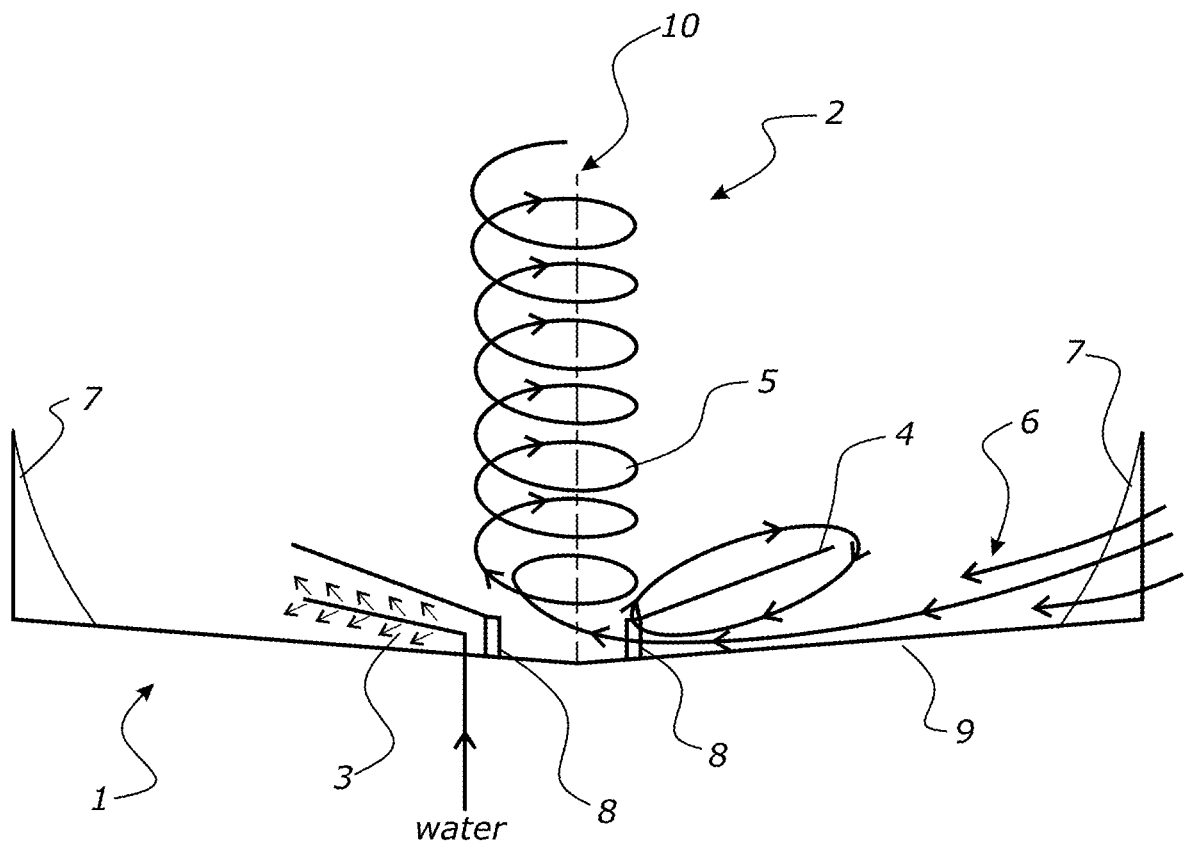
FIG. 21 is a cross-sectional view of the vortex station and vortex of the present invention.

FIG. 21 shows a further embodiment of a vortex station 1 in cross-section. The roof 4 is placed in the null-zone of meridional flows to prevent radial flows circumventing the turbine 8.

Input water 42 is fed through a manifold of nozzles 3 to produce a fine mist or spray with sufficient area for heat-transfer and vaporisation.

Figure 21A:
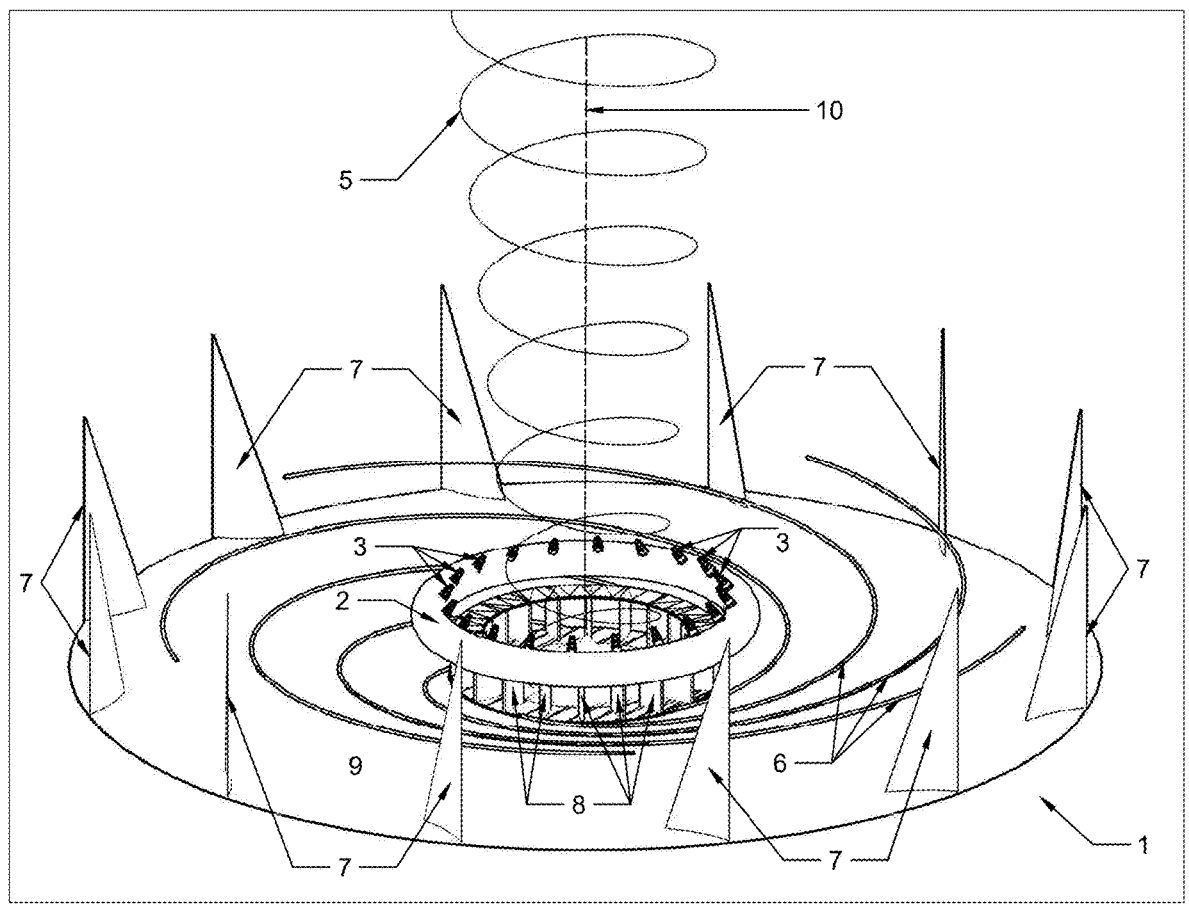
FIG. 21A is a perspective view of the vortex station and vortex of the present invention.

FIG. 21A shows a perspective view of the vortex station as described hereinabove with reference numerals as provided above directed to like components. Note, in particular air 6 drawn adjacent to the ground 9 through the vanes 7, which (as described above) are inclined at an angle to the radial, set in a surrounding circle around the vortex (termed a "swirl-henge"). The angle at which the air 6 enters is set by the angle of the vanes. Such vanes 7 are also somewhat curved in the shape of a yacht sail. Water nozzles 3 in a manifold are shown at the base 2 of the vortex 5 adjacent to the vertical blades 8 of a turbine (as also described above). The annular roof 4 (described above) is shown in phantom for clarity.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A method for producing a vortex in an outdoor environment comprising the steps of:
    providing a ground platform with a base;
    directing, with a plurality of swirl vanes, an air flow into the ground platform and about the ground platform from an ambient environment;
    rotating, by the air flow, at least one wind turbine centrally located or disposed at or near the base of the ground platform, and defining a center about which the turbine rotates, in a path of a concentrated air flow, wherein the swirl vanes rise in height above the wind turbine and are arranged in a substantially circular manner about the periphery of the vortex station, and wherein the turbine is located within an inflow of air from the swirl vanes, in proximity to ground platform and whence into the vortex,
    wherein the ground platform is free of a tower or cylindrical wall that encloses the vortex; and
    supplying a heated vaporizable liquid to the air flow via a plurality of nozzles mounted on the ground platform that surround the center, causing saturation or near saturation of the ambient temperature air in-flows.

2. The method of claim 1, wherein the step of supplying is free of external heating of the air outside the swirl vanes.

3. The method of claim 1, wherein the movement of the air is such that an atmospheric buoyancy vortex having a maximum height of approximately the tropopause is created in the center.

4. The method of claim 1, further comprising, defining an angle of the swirl vanes at an incline to the radial relative to the center, so that an angle at which the air enters the turbine in the inflow is set by the angle of the swirl vanes.

5. The method of claim 4, wherein the swirl vanes are curved in the shape of an airfoil.

6. The method of claim 5, wherein the swirl vanes are constructed from fabric or flexible sheet material.

7. The method of claim 4, further comprising, adjusting the angle of the swirl vanes relative to the radial.

8. The method of claim 1, wherein the turbine defines a plurality of vertical blades rotating about the center.

9. The method of claim 1, wherein the vaporizable liquid is water or a heated water stream.

10. The method of claim 1, further comprising, conditioning the air flowing into the vortex so as to allow release of a sufficient amount of latent heat through condensation in the created vortex core that maintains buoyancy and stability of the created vortex.

11. The method of claim 1, further comprising, producing, from the plurality of nozzles, a fine spray of the vaporizable liquid.

12. The method of claim 1, wherein the swirl vanes are constructed of fabric or flexible sheet material.

13. The method of claim 1, further comprising, locating an annular roof above the plurality of nozzles and the turbine about at the center.

14. The method of claim 1, wherein the turbine comprises a plurality of concentric turbines with a plurality of concentric blade sets.

15. The method of claim 1, further comprising, directing, with the plurality of nozzles, the vaporizable liquid into and against the inflow of air into the vortex.

16. The method of claim 1, wherein the ground platform defines a concave shape.

17. The method of claim 1, further comprising, collecting the vaporizable liquid in a drain in the ground platform.

18. The method of claim 17, further comprising, directing the vaporizable liquid from the drain to a reservoir or storage facility for directing the vaporizable liquid to the nozzles.

19. The method of claim 1, further comprising, generating electrical power based upon rotation of the turbine.

* * * * *